(12) United States Patent
Shirai

(10) Patent No.: US 9,580,123 B2
(45) Date of Patent: Feb. 28, 2017

(54) BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 9 days.

(21) Appl. No.: 14/728,998

(22) Filed: Jun. 2, 2015

(65) Prior Publication Data

US 2016/0355225 A1 Dec. 8, 2016

(51) Int. Cl.
*B62J 1/08* (2006.01)
*B62J 1/06* (2006.01)

(52) U.S. Cl.
CPC . *B62J 1/06* (2013.01); *B62J 1/08* (2013.01); *B62J 2001/085* (2013.01)

(58) Field of Classification Search
CPC .......... B62J 2001/085; B62J 1/06; F16F 9/56
See application file for complete search history.

(56) References Cited

U.S. PATENT DOCUMENTS

| | | | | |
|---|---|---|---|---|
| 4,989,698 A * | 2/1991 | Dony | ................... | F16F 9/0263 188/300 |
| 8,021,278 B2 * | 9/2011 | Huyck | ............... | A63B 22/0605 297/215.13 |
| 8,308,124 B2 | 11/2012 | Hsu | | |
| 9,376,153 B1 * | 6/2016 | Kuo | ........................... | B62J 1/08 |
| 9,403,568 B2 * | 8/2016 | Tseng | ........................ | B62J 1/08 |
| 2007/0215781 A1 * | 9/2007 | Watt | .................... | A63B 22/0046 248/622 |
| 2011/0187166 A1 * | 8/2011 | Walsh | ........................ | B62J 1/06 297/215.13 |
| 2011/0257848 A1 * | 10/2011 | Shirai | ..................... | B62K 19/36 701/49 |
| 2012/0228906 A1 * | 9/2012 | McAndrews | ............... | B62J 1/08 297/215.13 |
| 2013/0156492 A1 * | 6/2013 | Maier | ........................ | B62J 1/08 403/109.7 |
| 2014/0112703 A1 * | 4/2014 | Chen | ......................... | B62J 1/08 403/109.2 |
| 2014/0174286 A1 * | 6/2014 | Pittens | ...................... | F15B 1/26 91/5 |
| 2014/0205372 A1 * | 7/2014 | Kuo | ........................ | B62K 19/36 403/359.1 |
| 2015/0191208 A1 * | 7/2015 | Hsu | ............................ | B62J 1/06 403/322.3 |
| 2015/0284043 A1 * | 10/2015 | Kuo | ............................ | B62J 1/08 297/215.13 |
| 2016/0176463 A1 * | 6/2016 | McPherson | ................ | B62J 1/10 297/215.15 |

* cited by examiner

*Primary Examiner* — Bradley King
(74) *Attorney, Agent, or Firm* — Mori & Ward, LLP

(57) ABSTRACT

A bicycle seatpost assembly comprises a first cylinder, a second cylinder, a positioning structure, an actuation structure, and a connecting rod. The second cylinder is configured to be telescopically received in the first cylinder. The positioning structure is configured to relatively position the first cylinder and the second cylinder. The actuation structure is configured to actuate the positioning structure and is disposed at a distal end of the first cylinder. The connecting rod is configured to operatively couple a control cable to the actuation structure. The connecting rod extends from the distal end of the first cylinder in a longitudinal direction of the first cylinder.

24 Claims, 17 Drawing Sheets

BICYCLE SEATPOST ASSEMBLY

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle seatpost assembly.

SUMMARY OF THE INVENTION

In accordance with a first aspect of the present invention, a bicycle seatpost assembly comprises a first cylinder, a second cylinder, a positioning structure, an actuation structure, and a connecting rod. The second cylinder is configured to be telescopically received in the first cylinder. The positioning structure is configured to relatively position the first cylinder and the second cylinder. The actuation structure is configured to actuate the positioning structure and is disposed at a distal end of the first cylinder. The connecting rod is configured to operatively couple a control cable to the actuation structure. The connecting rod extends from the distal end of the first cylinder in a longitudinal direction of the first cylinder.

With the bicycle seatpost assembly in accordance with the first aspect, the connecting rod configured to operatively couple a control cable to the actuation structure, and the connecting rod extends from the distal end of the first cylinder in the longitudinal direction of the first cylinder. Accordingly, it is possible to adjust a route of the control cable to a preferable route suitable for a bicycle by changing a construction of the connecting rod.

In accordance with a second aspect of the present invention, the bicycle seatpost assembly according to the first aspect is configured so that the connecting rod is provided in the first cylinder.

With the bicycle seatpost assembly in accordance with the second aspect, it is possible to utilize an inner space of the first cylinder, suppressing enlargement of the bicycle seatpost assembly caused by the connecting rod.

In accordance with a third aspect of the present invention, the bicycle seatpost assembly according to the second aspect is configured so that the first cylinder includes an inner peripheral surface. The second cylinder includes an outer peripheral surface provided to face the inner peripheral surface of the first cylinder. The connecting rod is at least partly provided between the inner peripheral surface and the outer peripheral surface.

With the bicycle seatpost assembly in accordance with the third aspect, it is possible to utilize a space between the first cylinder and the second cylinder, suppressing enlargement of the bicycle seatpost assembly caused by the connecting rod.

In accordance with a fourth aspect of the present invention, the bicycle seatpost assembly according to the third aspect is configured so that the first cylinder includes a guide groove extending in the longitudinal direction and provided on the inner peripheral surface. The connecting rod is provided in the guide groove.

With the bicycle seatpost assembly in accordance with the fourth aspect, it is possible to utilize the space between the first cylinder and the second cylinder, suppressing enlargement of the bicycle seatpost assembly caused by the connecting rod. Furthermore, the guide groove can make the movement of the connecting rod smoother.

In accordance with a fifth aspect of the present invention, the bicycle seatpost assembly according to any one of the first to fourth aspects is configured so that the positioning structure includes a switching member configured to switch a state of the positioning structure between a positioning state where the first cylinder and the second cylinder are relatively positioned, and an adjustable state where a relative position between the first cylinder and the second cylinder is adjustable. The actuation structure is configured to move the switching member in the longitudinal direction.

In accordance with a sixth aspect of the present invention, the bicycle seatpost assembly according to the fifth aspect is configured so that the first cylinder includes an opposite end opposite to the distal end in the longitudinal direction. The actuation structure is configured to move the switching member in the longitudinal direction toward the opposite end of the first cylinder.

In accordance with a seventh aspect of the present invention, the bicycle seatpost assembly according to any one of the first to sixth aspects is configured so that the connecting rod includes a rod body, a first coupling end, and a second coupling end. The rod body extends along the longitudinal direction and includes a first rod end and a second rod end opposite to the first rod end. The first coupling end is provided at the first rod end and is configured to be coupled to the actuation structure. The second coupling end is provided at the second rod end and is configured to be coupled to the control cable.

With the bicycle seatpost assembly in accordance with the seventh aspect, since the connecting rod includes the first coupling end and the second coupling end, it is possible to easily couple the actuation structure and the control cable to the connecting rod.

In accordance with an eighth aspect of the present invention, the bicycle seatpost assembly according to the seventh aspect is configured so that the first coupling end has a first maximum length defined from the first rod end. The second coupling end has a second maximum length defined from the second rod end. The first maximum length is longer than the second maximum length.

With the bicycle seatpost assembly in accordance with the eighth aspect, it is possible to improve the design possibility of the actuation structure. Furthermore, it is possible to make the second coupling end compact, suppressing enlargement of the bicycle seatpost assembly caused by the connecting rod.

In accordance with a ninth aspect of the present invention, the bicycle seatpost assembly according to the seventh or eighth aspect is configured so that the actuation structure includes a first pin configured to be coupled to the first coupling end of the connecting rod. The first coupling end extends from the first rod end of the rod body toward the first pin and is contactable with the first pin.

With the bicycle seatpost assembly in accordance with the ninth aspect, it is possible to simplify a structure of the first coupling end.

In accordance with a tenth aspect of the present invention, the bicycle seatpost assembly according to the ninth aspect is configured so that the first rod end of the rod body is spaced apart from the first pin in a rest state where the connecting rod is not operated via the control cable.

With the bicycle seatpost assembly in accordance with the tenth aspect, it is possible to prevent interference between the first pin and the first rod end, allowing the connecting rod to smoothly move.

In accordance with an eleventh aspect of the present invention, the bicycle seatpost assembly according to any one of the seventh to tenth aspects further comprises a pivot member pivotable relative to the first cylinder about a pivot axis. The connecting rod is configured to be coupled to the control cable via the pivot member.

With the bicycle seatpost assembly in accordance with the eleventh aspect, the pivot member can make a movement direction of the connecting rod different from a pulling direction of the control cable. Accordingly, it is possible to adjust the pulling direction of the control cable to a preferable direction suitable for the arrangement of the bicycle seatpost assembly.

In accordance with a twelfth aspect of the present invention, the bicycle seatpost assembly according to the eleventh aspect is configured so that the pivot member includes a second pin configured to be coupled to the second coupling end of the connecting rod.

With the bicycle seatpost assembly in accordance with the twelfth aspect, it is possible to simplify a structure of the second coupling end.

In accordance with a thirteenth aspect of the present invention, the bicycle seatpost assembly according to the twelfth aspect is configured so that the second coupling end extends from the second rod end of the rod body toward the second pin and is contactable with the second pin.

In accordance with a fourteenth aspect of the present invention, the bicycle seatpost assembly according to the twelfth or thirteenth aspect is configured so that the second pin is at least partly provided radially outward of the first cylinder in a rest state where the connecting rod is not operated via the control cable.

In accordance with a fifteenth aspect of the present invention, the bicycle seatpost assembly according to any one of the twelfth to fourteenth aspects is configured so that the pivot member includes a cable attachment portion to which an inner wire of the control cable is attached. A first distance defined between the pivot axis and the second pin is longer than a second distance defined between the pivot axis and the cable attachment portion.

With the bicycle seatpost assembly in accordance with the fifteenth aspect, it is possible to reduce a pulling force applied to the control cable.

In accordance with a sixteenth aspect of the present invention, the bicycle seatpost assembly according to the fifteenth aspect further comprises an outer cover including an accommodation space in which the pivot member is pivotally provided.

With the bicycle seatpost assembly in accordance with the sixteenth aspect, it is possible to protect the pivot member.

In accordance with a seventeenth aspect of the present invention, the bicycle seatpost assembly according to the sixteenth aspect is configured so that the outer cover includes a cable guiding portion configured to guide the control cable in the longitudinal direction of the first cylinder.

With the bicycle seatpost assembly in accordance with the seventeenth aspect, it is possible to stabilize an operation of the control cable.

In accordance with an eighteenth aspect of the present invention, the bicycle seatpost assembly according to the seventeenth aspect is configured so that the cable guiding portion includes a guiding hole through which the control cable is to extend. The guiding hole extends from the accommodation space in the longitudinal direction toward the distal end of the first cylinder.

With the bicycle seatpost assembly in accordance with the eighteenth aspect, it is possible to guide the control cable with protecting the pivot member.

In accordance with a nineteenth aspect of the present invention, the bicycle seatpost assembly according to the seventeenth or eighteenth aspect is configured so that the cable guiding portion includes an outer-casing attachment part to which an outer casing of the control cable is to be attached.

With the bicycle seatpost assembly in accordance with the nineteenth aspect, it is possible to easily attach the outer casing of the control cable to the outer cover.

In accordance with a twentieth aspect of the present invention, the bicycle seatpost assembly according to any one of the seventh to nineteenth aspects is configured so that the rod body has a cross-sectional shape different from a circular shape. The cross-sectional shape is taken along a virtual plane perpendicular to the longitudinal direction of the first cylinder.

With the bicycle seatpost assembly in accordance with the twentieth aspect, it is possible to improve the design possibility of the connecting rod.

In accordance with a twenty-first aspect of the present invention, the bicycle seatpost assembly according to the twentieth aspect is configured so that the first cylinder includes an inner peripheral surface. The cross-sectional shape of the rod body is an elongated shape along the inner peripheral surface.

With the bicycle seatpost assembly in accordance with the twenty-first aspect, it is possible to efficiently arrange the rod body in the first cylinder, suppress enlargement of the bicycle seatpost assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
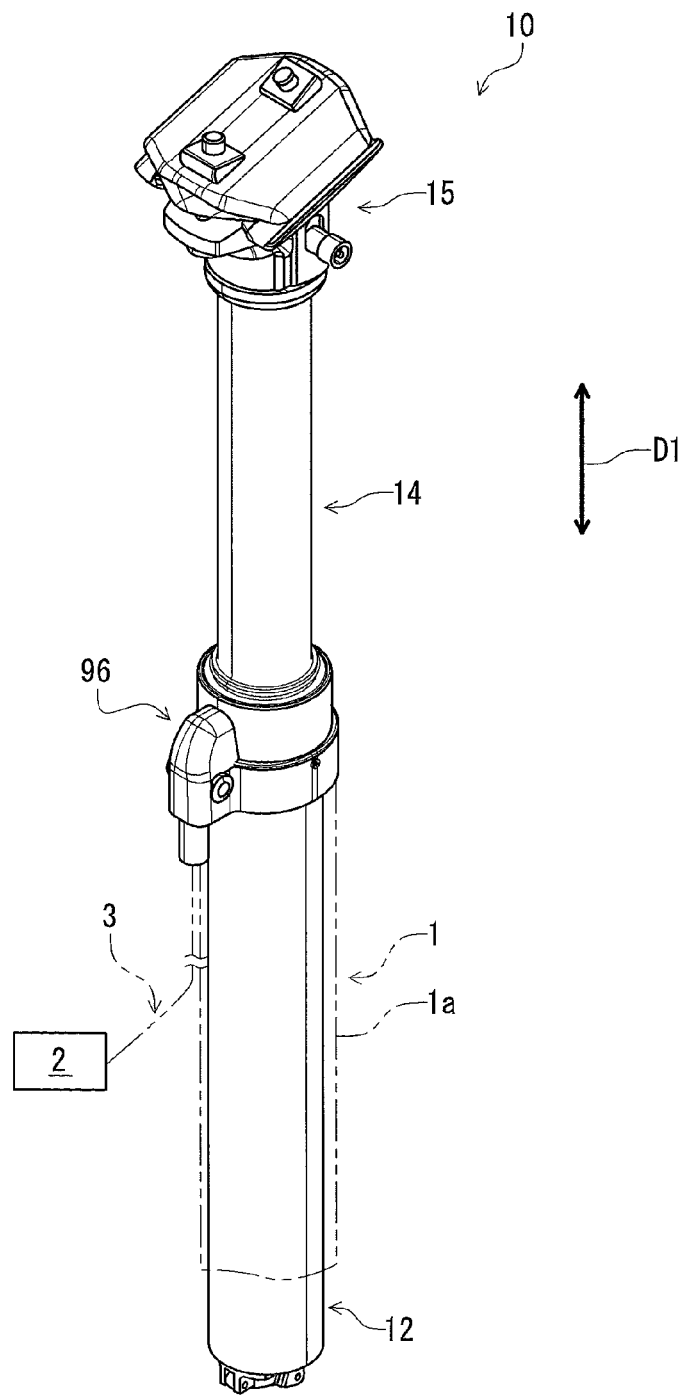
FIG. 1 is a perspective view of a bicycle seatpost assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle seatpost assembly 10 in accordance with a first embodiment comprises a first cylinder 12 and a second cylinder 14. The second cylinder 14 is configured to be telescopically received in the first cylinder 12. The first cylinder 12 and the second cylinder 14 are configured to be movable relative to each other in a telescopic direction D1. The first cylinder 12 is detachably attached to a seat tube 1a of a bicycle frame 1. The bicycle seatpost assembly 10 comprises a mounting structure 15 configured to fixedly mount a bicycle saddle (not shown) to the second cylinder 14. The mounting structure 15 is attached to an upper end of the second cylinder 14.

Figure 2:
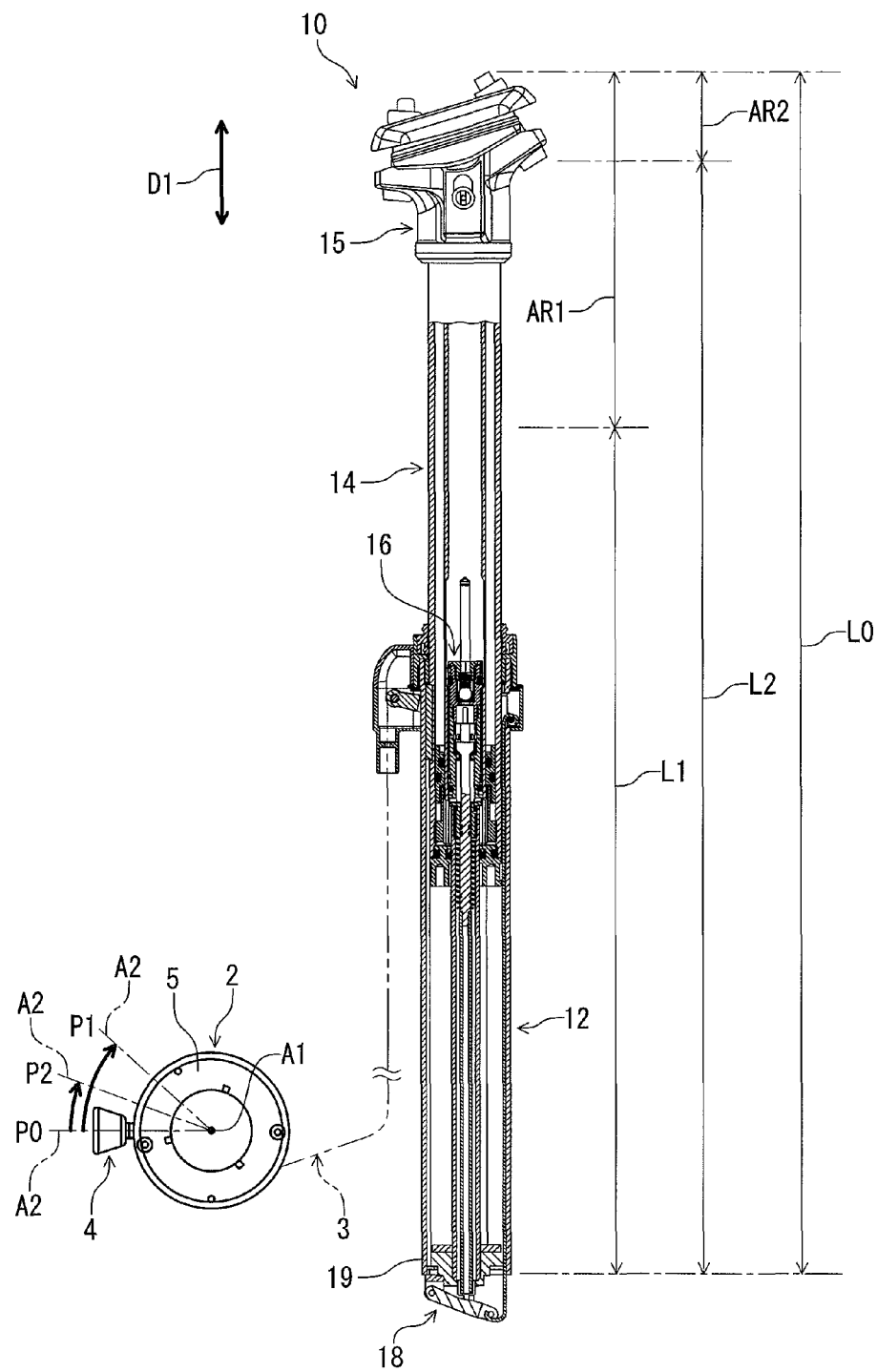
FIG. 2 is a cross-sectional view of the bicycle seatpost assembly illustrated in FIG. 1.

As seen in FIG. 2, the bicycle seatpost assembly 10 comprises a positioning structure 16 and an actuation structure 18. The positioning structure 16 is configured to relatively position the first cylinder 12 and the second cylinder 14. The positioning structure 16 is configured to be operated via an operating device 2. For example, the operating device 2 is mounted on a bicycle handlebar (not shown). The actuation structure 18 is configured to actuate the positioning structure 16 and is disposed at a distal end 19 of the first cylinder 12. In the illustrated embodiment, the distal end 19 is a lower end of the first cylinder 12 in a state where the bicycle seatpost assembly 10 is attached to the seat tube 1a of the bicycle frame 1. The actuation structure 18 is operatively coupled to an operating device 2 via a control cable 3 such as a Bowden cable.

In the present application, the following directional terms "forward", "rearward", "left", "right", "upward" and "downward" as well as any other similar directional terms refer to those directions which are determined on the basis of the rider who sits on the bicycle saddle (not shown) of a bicycle with facing the bicycle handlebar (not shown). Accordingly, these terms, as utilized to describe the bicycle seatpost assembly 10, should be interpreted relative to a bicycle equipped with the bicycle seatpost assembly 10 as used in an upright riding position on a horizontal surface.

As seen in FIG. 2, the operating device 2 is configured to output a first operation and a second operation different from the first operation. More specifically, the operating device 2 includes an operated member 4 and a base member 5. The operated member 4 is configured to be pivotable relative to the base member 5 from a rest position P0 to a first operated position P1 about a pivot axis A1. The operated member 4 is configured to be pivotable relative to the base member 5 from the rest position P0 to a second operated position P2 about the pivot axis A1. The second operated position P2 is defined between the rest position P0 and the first operated position P1. Each of the rest position P0, the second operated position P2, and the first operated position P1 is defined based on a center axis A2 of the operated member 4.

The control cable 3 is pulled by a first amount of operation when the operated member 4 is pivoted relative to the base member 5 from the rest position P0 to the first operated position P1. The control cable 3 is pulled by a second amount of operation when the operated member 4 is pivoted relative to the base member 5 from the rest position P0 to the second operated position P2. The second amount of operation is different from the first amount of operation. In the illustrated embodiment, the first amount of operation is larger than the second amount of operation.

As seen in FIG. 2, the bicycle seatpost assembly 10 has a maximum overall length L0 and a minimum overall length L1. The overall length of the bicycle seatpost assembly 10 is adjustable within a first adjustable range AR1 defined as a difference between the maximum overall length L0 and the minimum overall length L1. The bicycle seatpost assembly 10 has an intermediate overall length L2. The intermediate overall length L2 is defined between the maximum overall length L0 and the minimum overall length L1.

In the illustrated embodiment, the bicycle seatpost assembly 10 has a locked state, a first adjustable state, and a second adjustable state. In the locked state, the overall length of the bicycle seatpost assembly 10 is maintained at an adjusted overall length. In the locked state, the first cylinder 12 and the second cylinder 14 are fixedly positioned relative to each other in the telescopic direction D1.

In the first adjustable state, the overall length of the bicycle seatpost assembly 10 is continuously adjustable within the first adjustable range AR1 by operating the operated member 4 to the first operated position P1. Namely, in the first adjustable state, the positional relationship between the first cylinder 12 and the second cylinder 14 is continuously adjustable within the first adjustable range AR1.

In the second adjustable state, the overall length of the bicycle seatpost assembly 10 is adjustable to the intermediate overall length L2 by just operating the operated member 4 of the operating device 2 to the second operated position P2. More specifically, in the second adjustable state, the second cylinder 14 may stop relative to the first cylinder 12 at a position corresponding to the intermediate overall length L2 when the second cylinder 14 downwardly moves relative to the first cylinder 12 from a position corresponding to the maximum overall length L0 during the operation of the operating member 4 of the operating device 2 to the second operated position P2.

Furthermore, in the second adjustable state, the overall length of the bicycle seatpost assembly 10 is continuously adjustable within a second adjustable range AR2 by operating the operated member 4 of the operating device 2 to the second operated position P2. Namely, in the second adjustable state, the positional relationship between the first cylinder 12 and the second cylinder 14 is continuously adjustable within the second adjustable range AR2. The second adjustable range AR2 is defined as a difference between the maximum overall length L0 and the intermediate overall length L2.

As seen in FIG. 2, the first adjustable range AR1 and the second adjustable range AR2 are different from each other. In the illustrated embodiment, the second adjustable range AR2 entirely overlaps with the first adjustable range AR1 and is included in the first adjustable range AR1. The first adjustable range AR1 partially overlaps with the second adjustable range AR2.

The second adjustable range AR2 has a total length different from a total length of the first adjustable range AR1. In the illustrated embodiment, the total length of the second adjustable range AR2 is shorter than the total length of the first adjustable range AR1.

The positioning structure 16 is configured to switch a state of the bicycle seatpost assembly 10 among the locked state, the second adjustable state, and the first adjustable state in response to the operation of the operating device 2.

Figure 3:
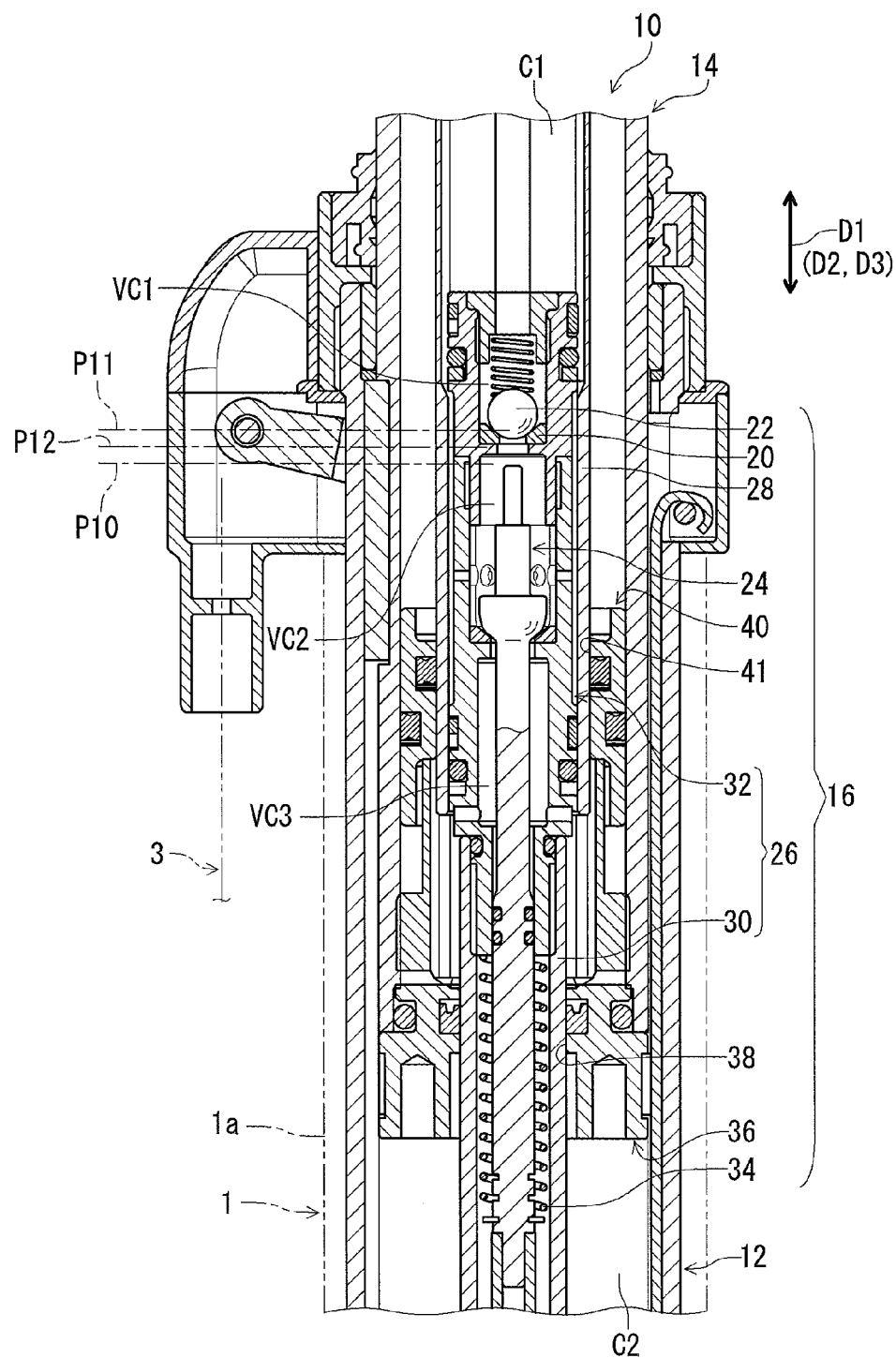
FIG. 3 is a partial cross-sectional view of the bicycle seatpost assembly illustrated in FIG. 1 (a closed position)

As seen in FIG. 3, the positioning structure 16 includes a receiving member 20, a first seal member 22, and a switching member 24. Namely, the bicycle seatpost assembly 10 comprises the receiving member 20, the first seal member 22, and the switching member 24. The switching member 24 is configured to switch a state of the positioning structure 16 between a positioning state and an adjustable state. In the positioning state, the first cylinder 12 and the second cylinder 14 are relatively positioned. In other words, in the positioning state, the first cylinder 12 and the second cylinder 14 do not move relative to each other in the telescopic direction D1. In the adjustable state, a relative position between the first cylinder 12 and the second cylinder 14 is adjustable. Specifically, the bicycle seatpost assembly 10 is in the locked state when the positioning structure 16 is in the positioning state. The bicycle seatpost assembly 10 is in the first adjustable state and the second adjustable state when the positioning structure 16 is in the adjustable state.

The positioning structure 16 includes a support member 26 configured to movably support the switching member 24. The support member 26 has a tubular shape. The switching member 24 is movably provided in the support member 26. In the illustrated embodiment, the switching member 24 is movable relative to the support member 26 in the telescopic direction D1.

As seen in FIG. 3, the positioning structure 16 includes an inner tube 28. The support member 26 is configured to be telescopically movable relative to the inner tube 28. The support member 26 and the inner tube 28 extend in the telescopic direction D1. The support member 26 is provided in the first cylinder 12. A lower end of the support member 26 is secured to the distal end 19 of the first cylinder 12 (FIG. 2). The support member 26 is integrally movable with the first cylinder 12 relative to the second cylinder 14 in the telescopic direction D1 when adjusting the overall length of the bicycle seatpost assembly 10. The inner tube 28 is provided in the second cylinder 14. An upper end of the inner tube 28 is secured to the mounting structure 15 (FIG. 2). The inner tube 28 is integrally movable with the second cylinder 14 relative to the first cylinder 12 in the telescopic direction D1 when adjusting the overall length of the bicycle seatpost assembly 10. The support member 26 can be secured to the second cylinder 14, and the inner tube 28 can be secured in the first cylinder 12 if needed and/or desired.

As seen in FIG. 3, the support member 26 includes a support tube 30 and a valve support 32. The support tube 30 extends in the telescopic direction D1. The valve support 32 is secured to an upper end of the support tube 30 and is movably provided in the inner tube 28. The switching member 24 is movably provided in the support tube 30 and the valve support 32. The valve support 32 includes a first valve chamber VC1, a second valve chamber VC2, and a third valve chamber VC3. The second valve chamber VC2 is provided between the first valve chamber VC1 and the third valve chamber VC3 in the telescopic direction D1. The first seal member 22 is provided in the first valve chamber VC1. The switching member 24 is movably provided in the second valve chamber VC2 and the third valve chamber VC3.

Figure 5:
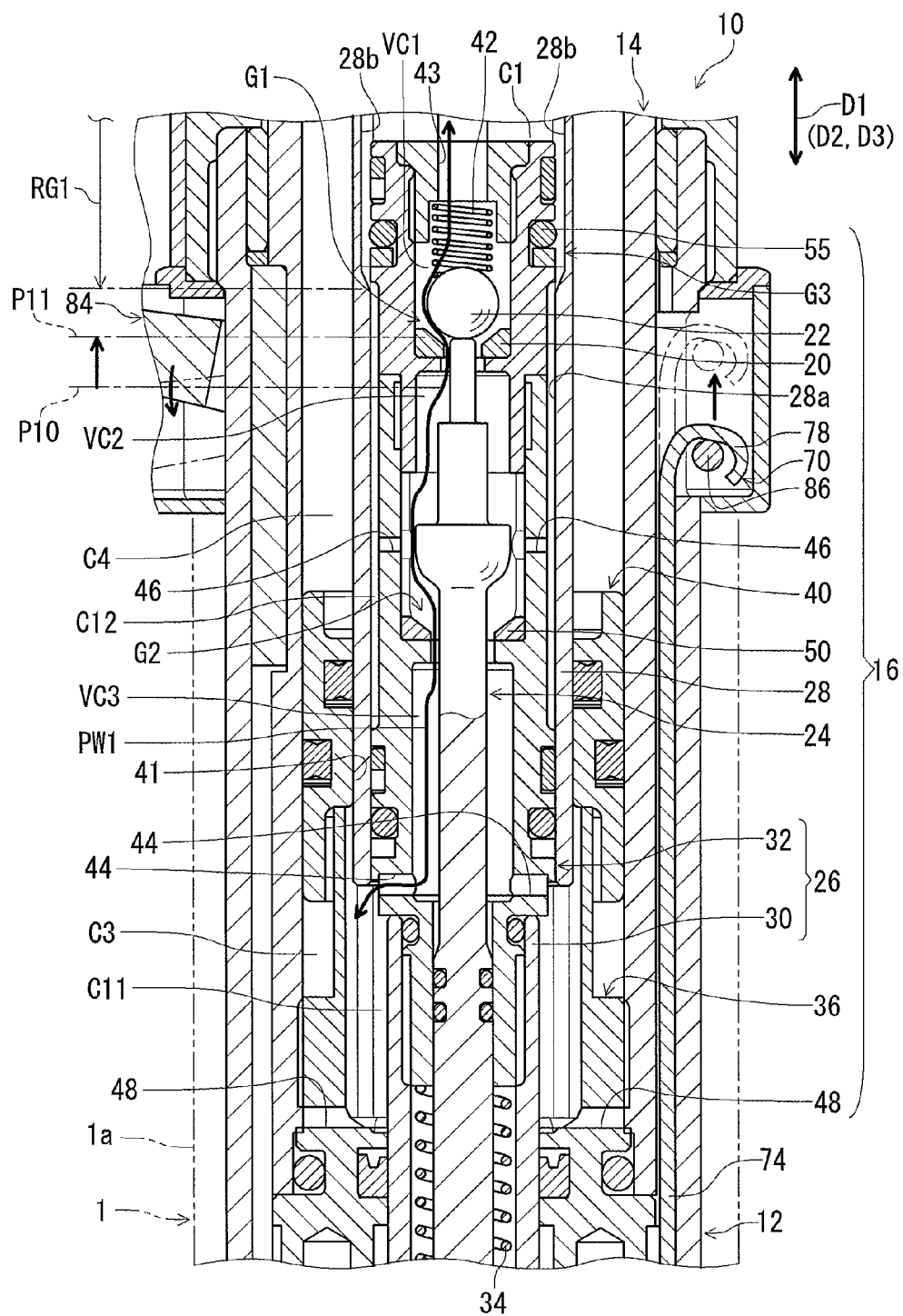
FIG. 5 is an enlarged partial cross-sectional view of the bicycle seatpost assembly illustrated in FIG. 1 (a first open position)
Figure 6:
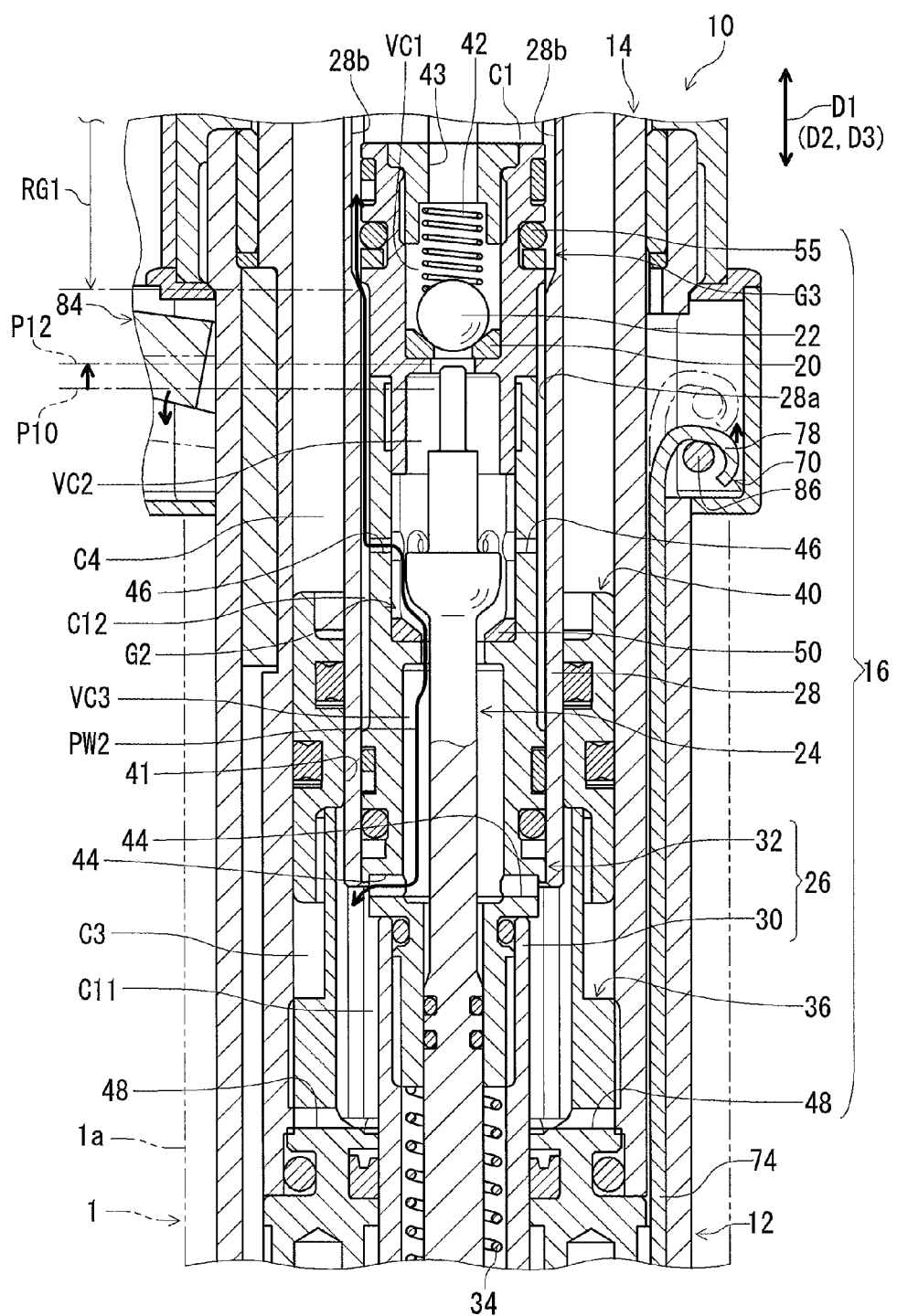
FIG. 6 is an enlarged partial cross-sectional view of the bicycle seatpost assembly illustrated in FIG. 1 (a second open position)

The first seal member 22, the support member 26, and the switching member 24 constitute a valve structure. The valve structure has a closed state (FIG. 4), a first open state (FIG. 5), and a second open state (FIG. 6). The closed state corresponds to the locked state of the bicycle seatpost assembly 10. The first open state corresponds to the first adjustable state of the bicycle seatpost assembly 10. The second open state corresponds to the second adjustable state of the bicycle seatpost assembly 10.

As seen in FIG. 3, the switching member 24 is configured to be positioned at a closed position P10, a first open position P11, and a second open position P12. The closed position P10, the first open position P11, and the second open position P12 are defined by a position of an upper tip end of the switching member 24 in the telescopic direction D1. In the closed state of the valve structure, the switching member 24 is positioned at the closed position P10. In the first open state of the valve structure, the switching member 24 is positioned at the first open position P11. In the second open state of the valve structure, the switching member 24 is positioned at the second open position P12.

The second open position P12 is provided between the closed position P10 and the first open position P11 in a movement direction D2 of the switching member 24. While the movement direction D2 of the switching member 24 coincides with the telescopic direction D1 of the bicycle seatpost assembly 10, the movement direction D2 can be different from the telescopic direction D1.

The positioning structure 16 includes a biasing element 34 configured to bias the switching member 24 relative to the support member 26 toward the closed position P10. The switching member 24 is configured to be positioned at the closed position P10 by a biasing force of the biasing element 34. The switching member 24 is moved from the closed position P10 toward the first open position P11 relative to the support member 26 against the biasing force of the biasing element 34. The position of the switching member 24 is continuously adjustable relative to the support member 26 between the closed position P10 and the first open position P11 using the operating device 2 (FIG. 2).

Figure 4:
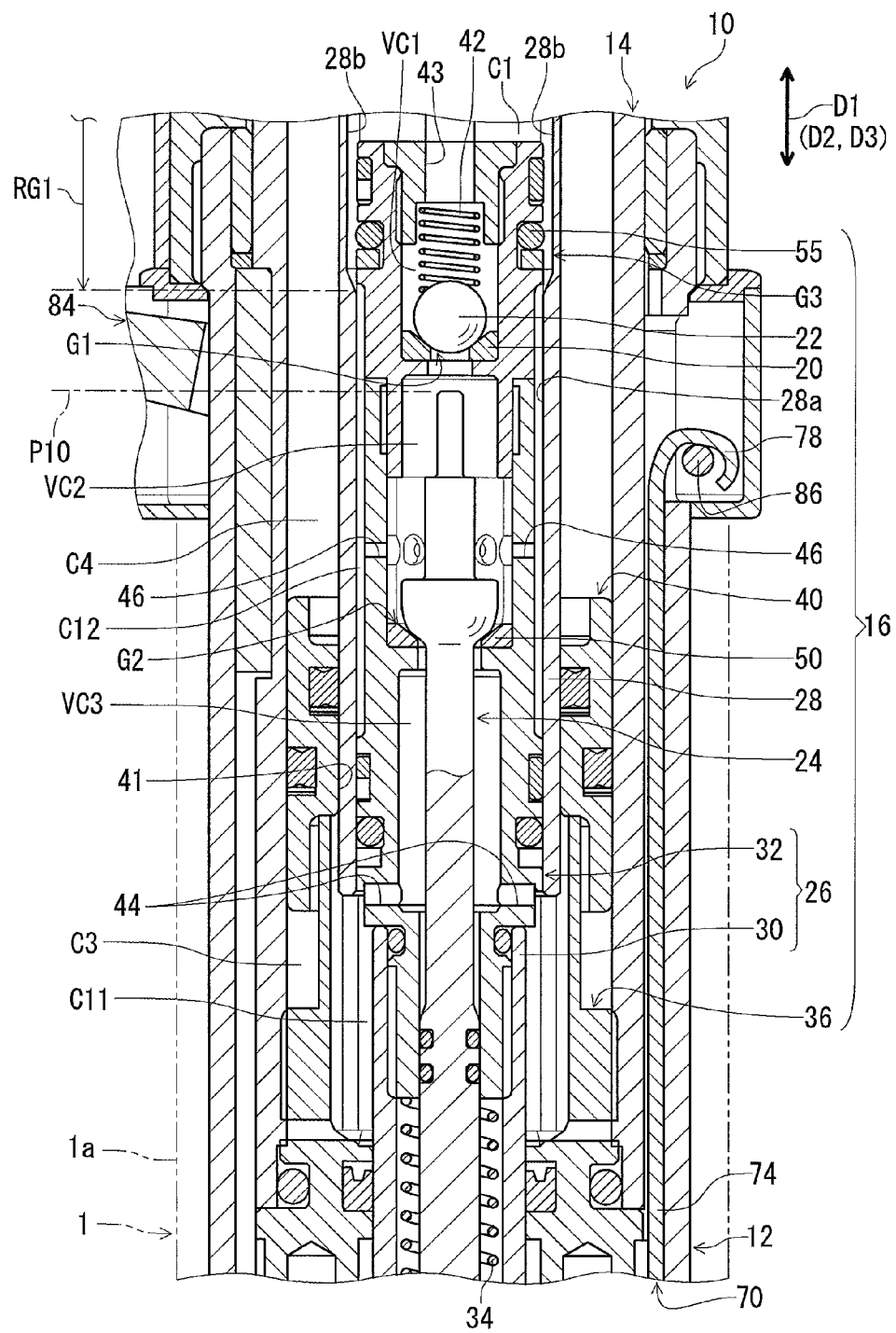
FIG. 4 is an enlarged partial cross-sectional view of the bicycle seatpost assembly illustrated in FIG. 1 (the closed position)

As seen in FIG. 4, the switching member 24 is positioned at the closed position P10 in a state where the operated member 4 of the operating device 2 is disposed at the rest position P0 (FIG. 2). As seen in FIG. 5, the switching member 24 is positioned at the first open position P11 via the control cable 3 and the actuation structure 18 (FIG. 2) in a state where the operated member 4 of the operating device 2 is disposed at the first operated position P1 (FIG. 2). As seen in FIG. 6, the switching member 24 is positioned at the second open position P12 via the actuation structure 18 and the control cable 3 in a state where the operated member 4 of the operating device 2 is disposed at the second operated position P2 (FIG. 2). Thus, an amount of movement of the switching member 24 is in proportion to a pulling amount of the control cable 3.

As seen in FIG. 3, the positioning structure 16 includes a sealing structure 36 having an annular shape. The sealing structure 36 is secured to a lower end of the second cylinder 14. A lower end of the inner tube 28 is secured to the sealing structure 36. Namely, the inner tube 28 and the sealing structure 36 are integrally movable with the second cylinder 14 relative to the first cylinder 12 in the telescopic direction D1. The sealing structure 36 includes a guide hole 38 extending in the telescopic direction D1. The support member 26 extends through the guide hole 38 of the sealing structure 36 in the telescopic direction D1.

The positioning structure 16 includes a piston 40 having an annular shape. The piston 40 is provided between the second cylinder 14 and the inner tube 28 in a radial direction of the piston 40. The piston 40 includes a guide hole 41 extending in the telescopic direction D1. The inner tube 28 extends through the guide hole 41 of the piston 40 in the telescopic direction D1. The piston 40 is movable relative to the second cylinder 14 and the inner tube 28 in the telescopic direction D1.

As seen in FIG. 3, the positioning structure 16 includes a first chamber C1 and a second chamber C2. The first chamber C1 is defined by the support member 26, the inner tube 28, and the mounting structure 15 (FIG. 2). The second chamber C2 is defined by the first cylinder 12, the support member 26, the sealing structure 36, and the actuation structure 18 (FIG. 2). The first chamber C1 is filled with a substantially incompressible fluid (e.g., oil), for example. The second chamber C2 is filled with a compressible fluid (e.g., air or gas other than air). The second chamber C2 is in communication with an outside of the bicycle seatpost assembly 10, for example. However, the second chamber C2 may be sealed up, if needed and/or desired.

As seen in FIG. 4, a third chamber C3 is defined by the second cylinder 14, the inner tube 28, the sealing structure 36, and the piston 40. A first intermediate chamber C11 is defined by the inner tube 28, the support member 26, and the sealing structure 36. A second intermediate chamber C12 is defined by the support member 26 and the inner tube 28. Each of the third chamber C3, the first intermediate chamber C11, and the second intermediate chamber C12 is filled with the substantially incompressible fluid (e.g., oil), for example.

A biasing chamber C4 is defined by the second cylinder 14, the inner tube 28, the piston 40, and the mounting structure 15 (FIG. 2). A compressible fluid (e.g., air or gas other than air) is filled in the biasing chamber C4. The biasing chamber C4 is configured to apply a biasing force to the piston 40 so that the second cylinder 14 upwardly moves relative to the first cylinder 12 in the telescopic direction D1. The compressible fluid is compressed in the biasing chamber C4 in a state where the overall length of the bicycle seatpost assembly 10 is the maximum overall length L0 (FIG. 2).

As seen in FIG. 4, the switching member 24 is a separate member from the first seal member 22. The first seal member 22 is provided on an opposite side of the switching member 24 relative to the receiving member 20, in a state where the switching member 24 is disposed in one of the closed position P10 and the second open position P12. The switching member 24 is spaced apart from the first seal member 22 in the telescopic direction D1 in the closed state where the switching member 24 is disposed at the closed position P10. The receiving member 20 is provided between the first seal member 22 and the switching member 24 in the telescopic direction D1 in the closed state where the switching member 24 is disposed at the closed position P10. While the switching member 24 is a separate member from the first seal member 22, the switching member 24 can be integrally provided with the first seal member 22 as a single unitary member so as to move together with the first seal member 22.

As seen in FIG. 5, the first seal member 22 is configured to provide a first gate G1 of a first passageway PW1 together with the receiving member 20. As seen in FIG. 4, the first seal member 22 is contactable with the receiving member 20 to close the first gate G1. The switching member 24 is configured to move the first seal member 22 relative to the receiving member 20 to open the first gate G1. The first valve chamber VC1 is in communication with the second valve chamber VC2 via the first gate G1 in a state where the first gate G1 is open.

As seen in FIG. 4, the positioning structure 16 includes a valve biasing member 42 configured to bias the first seal member 22 toward the receiving member 20 so that the first seal member 22 is in contact with the receiving member 20. The switching member 24 is configured to move the first seal member 22 relative to the receiving member 20 against a biasing force of the valve biasing member 42 to open the first gate G1. The first seal member 22 is provided between the receiving member 20 and the valve biasing member 42 in the telescopic direction D1. The first seal member 22 is provided between the switching member 24 and the valve biasing member 42 in the telescopic direction D1. The valve biasing member 42 is provided in the first valve chamber VC1. While the valve biasing member 42 is a spring, the valve biasing member 42 can be a biasing member other than the spring.

The switching member 24 is movable relative to the support member 26 between the closed position P10 where the first seal member 22 is in contact with the receiving member 20 to close the first gate G1, and the first open position P11 where the switching member 24 moves the first seal member 22 so that the first seal member 22 is spaced apart from the receiving member 20 to open the first gate G1.

In the illustrated embodiment, the switching member 24 is configured to press the first seal member 22 to move away from the receiving member 20 so that the first gate G1 is open. The switching member 24 can be configured to pull the first seal member 22 to move away from the receiving member 20 if needed and/or desired. In such an embodiment, for example, the first seal member 22 is provided on the same side as the switching member 24 relative to the receiving member 20.

As seen in FIG. 5, the first passageway PW1 is configured to connect the first chamber C1 to the third chamber C3. More specifically, the support member 26 includes a first through-hole 43, second through-holes 44, and third through-holes 46. The first through-hole 43 is configured to connect the first chamber C1 to the first valve chamber VC1. The second through-holes 44 are configured to connect the third valve chamber VC3 to the first intermediate chamber C11. The third through-holes 46 are configured to connect the third valve chamber VC3 to the second intermediate chamber C12. The first passageway PW1 includes the first through-hole 43, the first to third valve chambers VC1 to VC3, the second through-holes 44, and the first intermediate chamber C11. The first intermediate chamber C11 is configured to be in communication with the third chamber C3 via a clearance between the sealing structure 36 and the piston 40.

As seen in FIG. 4, the positioning structure 16 includes a second seal member 50. The switching member 24 is contactable with the second seal member 50. The second seal member 50 is provided between the second valve chamber VC2 and the third valve chamber VC3. As seen in FIG. 6, the second seal member 50 is configured to provide a second gate G2 of a second passageway PW2 together with the switching member 24. The second valve chamber VC2 is in communication with the third valve chamber VC3 via the second gate G2 in a state where the second gate G2 is open. In the illustrated embodiment, the second seal member 50 is a seal ring having substantially the same structure as that of the receiving member 20.

As seen in FIGS. 4 and 6, the switching member 24 is movable relative to the support member 26 between the closed position P10 where the switching member 24 is in contact with the second seal member 50 to close the second gate G2, and the second open position P12 where the switching member 24 is spaced apart from the second seal member 50 to open the second gate G2.

As seen in FIG. 6, the second passageway PW2 is at least partially provided radially outward of the support member 26. In the illustrated embodiment, the second passageway PW2 is at least partially provided radially outward of the support member 26 in the movement direction D2 of the switching member 24. The second passageway PW2 includes the second intermediate chamber C12, the third through-holes 46, the third valve chamber VC3, the second through-holes 44, and the first intermediate chamber C11.

The switching member 24 is configured to be provided at the second open position P12 so that the first seal member 22 is in contact with the receiving member 20 to close the first gate G1. The switching member 24 is spaced apart from the first seal member 22 in a state where the switching member 24 is disposed at the second open position P12.

As seen in FIG. 5, the switching member 24 is configured to be provided at the first open position P11 so that the switching member 24 is spaced apart from the second seal member 50 to open the second gate G2. The first gate G1 and the second gate G2 are open so that the first passageway PW1 connects the first chamber C1 to the third chamber C3 in the state where the switching member 24 is disposed at the first open position P11. Namely, the second gate G2 is provided on the first passageway PW1 in addition to the first gate G1.

Figure 7:
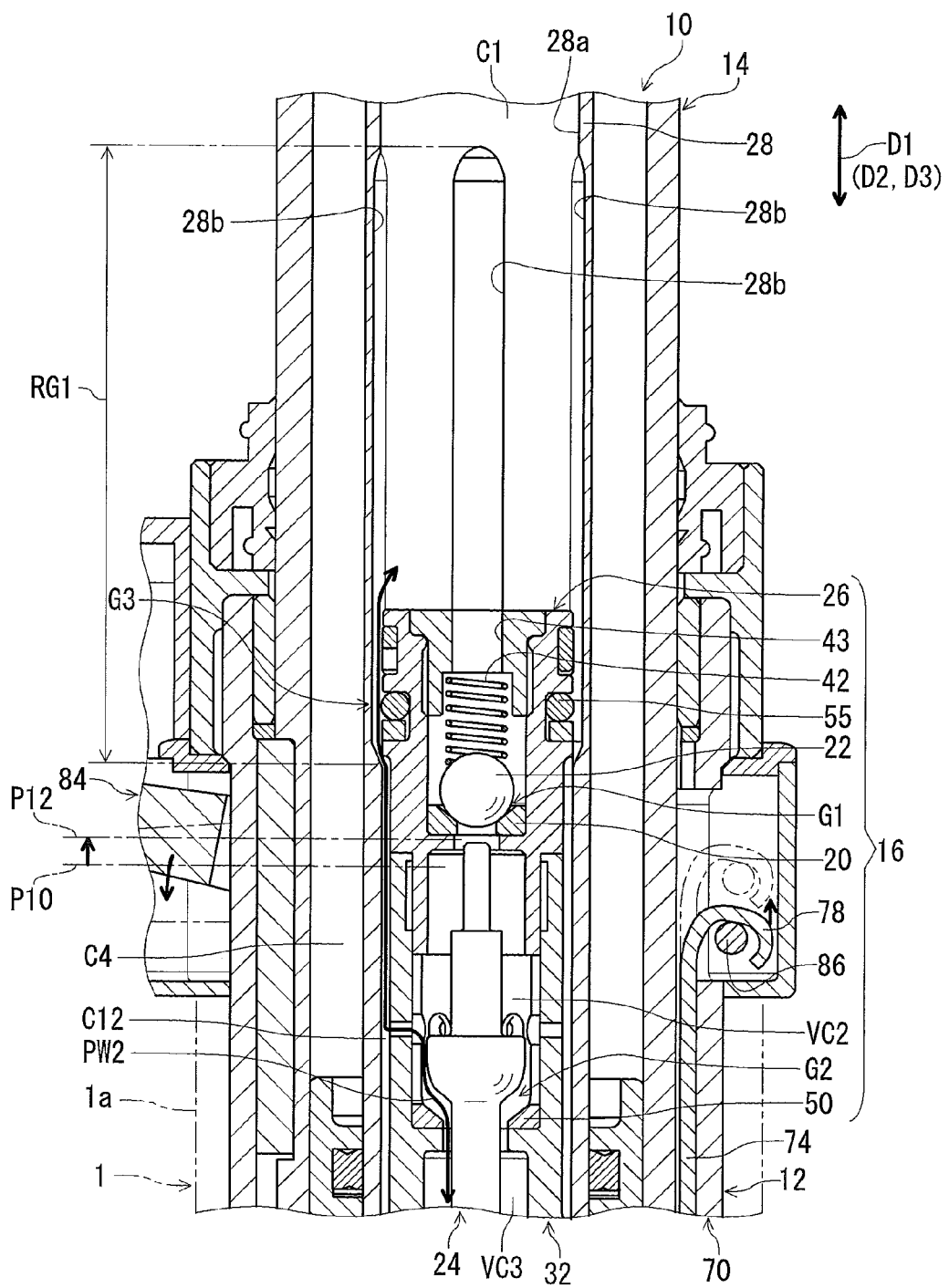
FIG. 7 is an enlarged partial cross-sectional view of the bicycle seatpost assembly illustrated in FIG. 1 (the second open position)

As seen in FIG. 7, the inner tube 28 includes an inner peripheral surface 28a and recesses 28b recessed from the inner peripheral surface 28a. The positioning structure 16 includes a third seal member 55 provided on an outer periphery of the support member 26.

The recesses 28b extend in the telescopic direction D1 and are circumferentially spaced apart from each other. The third seal member 55 is contactable with the inner peripheral surface 28a of the inner tube 28. The third seal member 55 is configured to provide a third gate G3 of the second passageway PW2 between the third seal member 55 and the inner tube 28. The third gate G3 is open in a state where the third seal member 55 is disposed within a range RG1 where the recesses 28b are provided.

Figure 8:
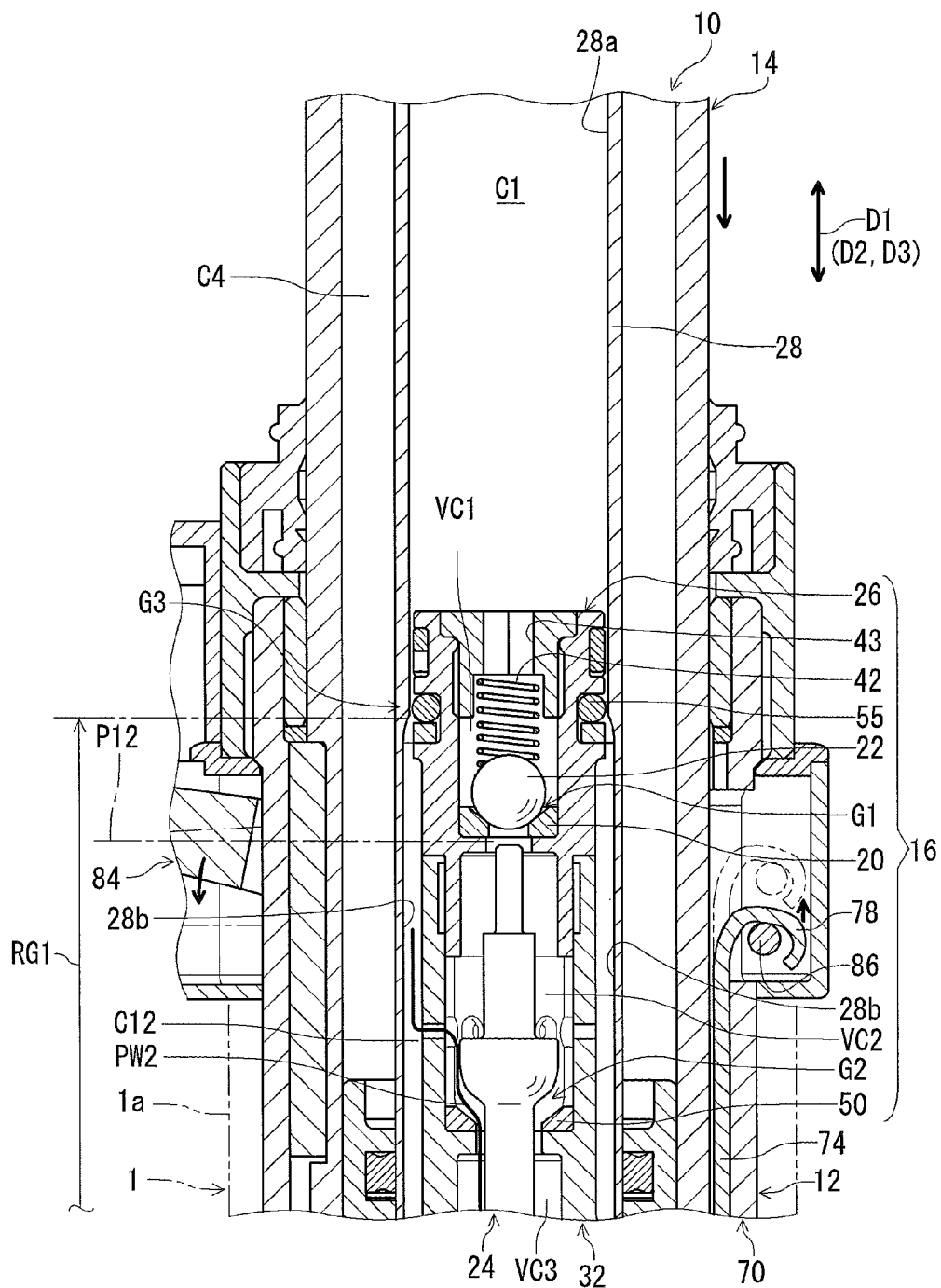
FIG. 8 is an enlarged partial cross-sectional view of the bicycle seatpost assembly illustrated in FIG. 1 (the second open position)

As seen in FIG. 8, the third gate G3 is closed in a state where the third seal member 55 is disposed outside the range RG1. For example, the third seal member 55 is in contact with the inner peripheral surface 28a of the inner tube 28 along an inner whole periphery of the inner tube 28 in a state where the third seal member 55 is disposed on an upper side of the recesses 28b. In this state, the third gate G3 is closed so that the first chamber C1 is not in communication with the third chamber C3 via the second passageway PW2. The total length of the bicycle seatpost assembly 10 is the intermediate overall length L2 (FIG. 2).

While the recesses 28b has a shape such as a groove extending in the telescopic direction D1 in the illustrated embodiment, the recesses 28b can have shapes other than the grooves if needed and/or desired. For example, the recesses 28b can circumferentially connected with each other to provide an annular shape along the inner whole periphery of the inner tube 28. Furthermore, the inner tube 28 can include at least one recess 28b if needed and/or desired.

Figure 9:
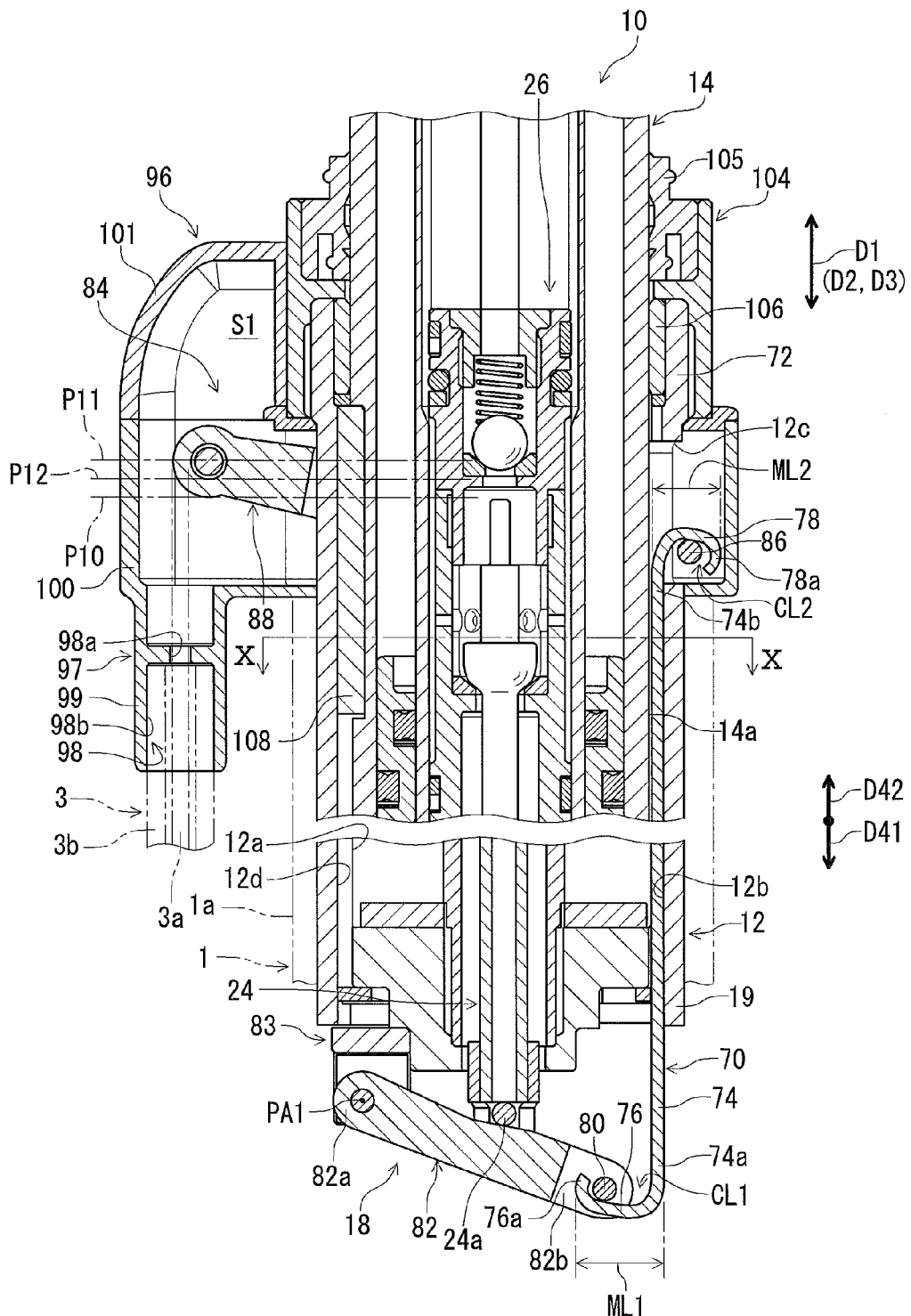
FIG. 9 is a partial cross-sectional view of the bicycle seatpost assembly illustrated in FIG. 1 (the closed position)

As seen in FIG. 9, the bicycle seatpost assembly 10 comprises a connecting rod 70 configured to operatively couple the control cable 3 to the actuation structure 18. The connecting rod 70 extends from the distal end 19 of the first cylinder 12 in a longitudinal direction D3 of the first cylinder 12. The connecting rod 70 is movable relative to the first cylinder 12 in the longitudinal direction D3. In the illustrated embodiment, the longitudinal direction D3 is parallel to each of the telescopic direction D1 and the movement direction D2. The connecting rod 70 is made of a rigid material such as a metallic material. The connecting rod 70 has a compressive strength that is defined in the longitudinal direction D3 and that is larger than a compressive strength of an inner wire 3a of the control cable 3. The connecting rod 70 can reduce a frictional resistance between the connecting rod 70 and the first cylinder 12 compared with the control cable 3.

Figure 10:
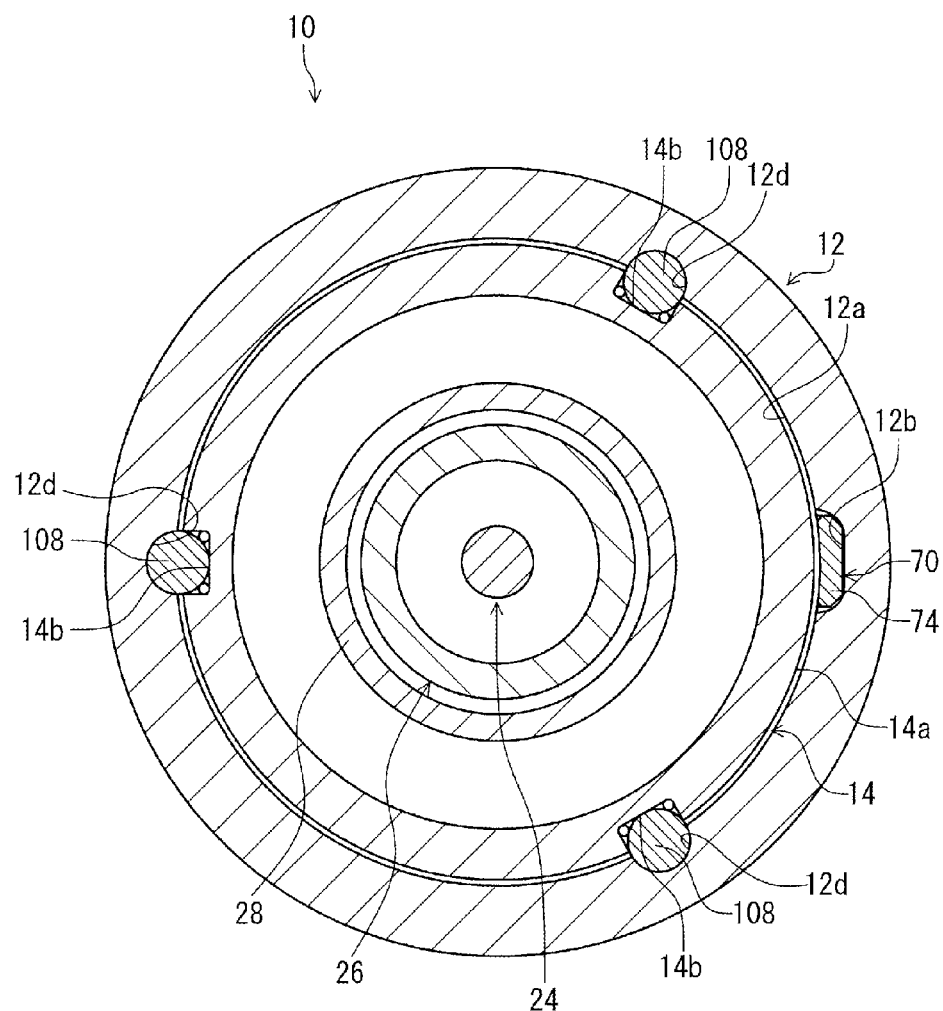
FIG. 10 is a cross-sectional view of the bicycle seatpost assembly taken along line X-X of FIG. 9.

As seen in FIGS. 9 and 10, the connecting rod 70 is provided in the first cylinder 12. The first cylinder 12 includes an inner peripheral surface 12a. The second cylinder 14 includes an outer peripheral surface 14a provided to face the inner peripheral surface 12a of the first cylinder 12. The connecting rod 70 is at least partly provided between the inner peripheral surface 12a and the outer peripheral surface 14a. In the illustrated embodiment, as seen in FIG. 9, the connecting rod 70 is partly provided between the inner peripheral surface 12a and the outer peripheral surface 14a. However, the connecting rod 70 can be entirely provided between the inner peripheral surface 12a and the outer peripheral surface 14a if needed and/or desired.

As seen in FIGS. 9 and 10, the first cylinder 12 includes a guide groove 12b extending in the longitudinal direction and is provided on the inner peripheral surface 12a. The connecting rod 70 is provided in the guide groove 12b. Specifically, the connecting rod 70 is provided in the guide groove 12b to be movable relative to the first cylinder 12 in the longitudinal direction D3.

As seen in FIG. 10, the rod body 74 has a cross-sectional shape different from a circular shape. The cross-sectional shape is taken along a virtual plane perpendicular to the longitudinal direction D3 of the first cylinder 12. The cross-sectional shape of the rod body 74 is an elongated shape along the inner peripheral surface 12a. However, the cross-sectional shape of the rod body 74 is not limited to the illustrated embodiment. For example, the cross-sectional shape of the rod body 74 can be other shapes such as a circular shape and an oval shape.

As seen in FIG. 9, the actuation structure 18 is configured to move the switching member 24 in the longitudinal direction D3. The first cylinder 12 includes an opposite end 72 opposite to the distal end 19 in the longitudinal direction D3. The actuation structure 18 is configured to move the switching member 24 in the longitudinal direction D3 toward the opposite end 72 of the first cylinder 12.

The connecting rod 70 includes a rod body 74, a first coupling end 76, and a second coupling end 78. The rod body 74 extends along the longitudinal direction D3. The rod body 74 includes a first rod end 74a and a second rod end 74b opposite to the first rod end 74a. The first coupling end 76 is provided at the first rod end 74a and is configured to be coupled to the actuation structure 18. The second coupling end 78 is provided at the second rod end 74b and is configured to be coupled to the control cable 3. In the illustrated embodiment, the second coupling end 78 is closer to the opposite end 72 of the first cylinder 12 than the distal end 19 of the first cylinder 12.

As seen in FIG. 9, the first coupling end 76 has a first maximum length ML1 defined from the first rod end 74a in a direction perpendicular to the longitudinal direction D3. The second coupling end 78 has a second maximum length ML2 defined from the second rod end 74b in a direction perpendicular to the longitudinal direction D3. The first maximum length ML1 is longer than the second maximum length ML2. However, the first maximum length ML1 can be equal to or shorter than the second maximum length ML2 if needed and/or desired.

The actuation structure 18 includes a first pin 80 configured to be coupled to the first coupling end 76 of the connecting rod 70. The first coupling end 76 extends from the first rod end 74a of the rod body 74 toward the first pin 80 and is contactable with the first pin 80. The first rod end 74a of the rod body 74 is spaced apart from the first pin 80 in a rest state where the connecting rod 70 is not operated via the control cable 3. The first coupling end 76 includes a first curved end 76a spaced apart from the first rod end 74a. The first pin 80 is provided between the first curved end 76a and the first rod end 74a. A first clearance CL1 is provided between the first rod end 74a and the first pin 80 in the rest state of the connecting rod 70.

Figure 11:
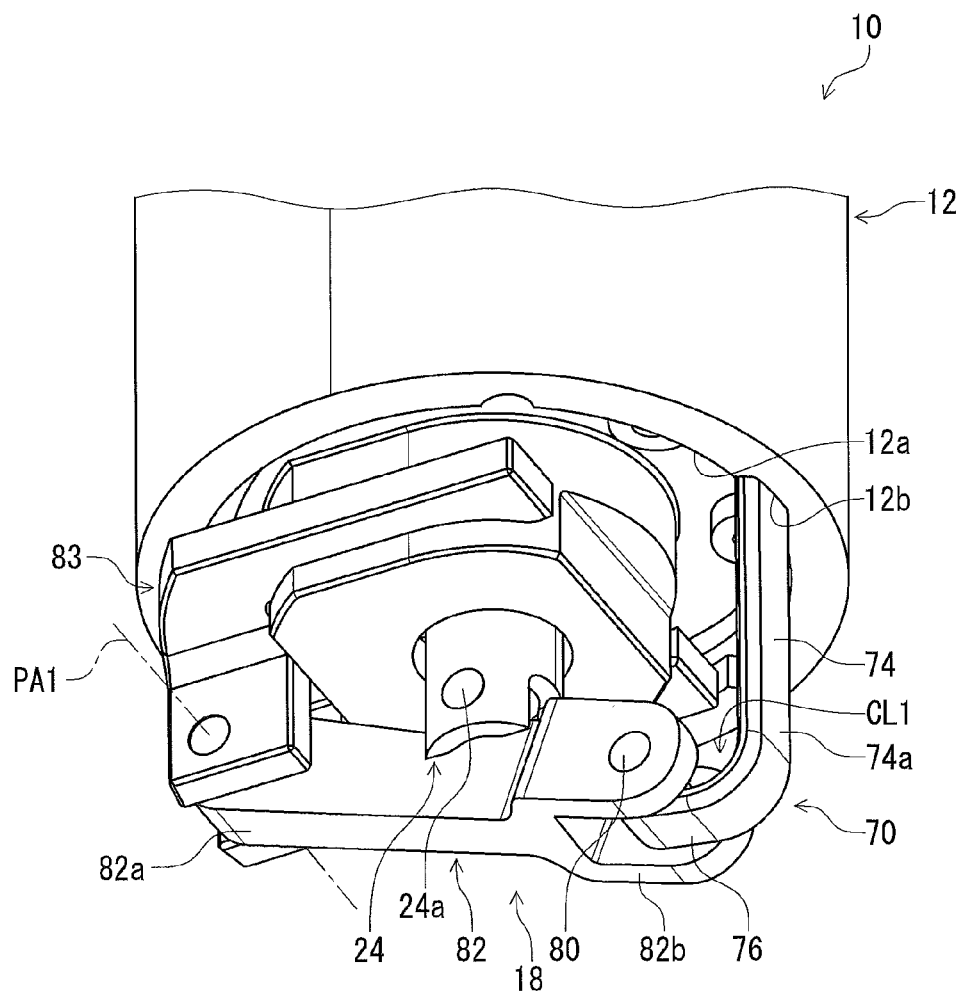
FIG. 11 is a partial perspective view of the bicycle seatpost assembly illustrated in FIG. 1.

As seen in FIG. 11, the actuation structure 18 includes a lever 82 pivotable relative to the first cylinder 12 about a lever pivot axis PA1. The first pin 80 is secured to the lever 82. Specifically, the lever 82 includes a first lever end 82a and a second lever end 82b. The first lever end 82a is pivotably coupled to the distal end 19 of the first cylinder 12. In the illustrated embodiment, the bicycle seatpost assembly 10 comprises an end member 83 attached to the distal end 19 of the first cylinder 12. The first lever end 82a is pivotably coupled to the end member 83. The first pin 80 is secured to the second lever end 82b. In the illustrated embodiment, the first pin 80 is non-rotatably fixed to the second lever end 82b. However, the first pin 80 can be rotatably connected to the second lever end 82b to reduce the friction between the first pin 80 and the first coupling end 76. An end of the switching member 24 includes a third pin 24a which is engaged with a middle part of the lever 82. In the illustrated embodiment, the third pin 24a is non-rotatably fixed to the end of the switching member 24. However, the third pin 24a can be rotatably connected to the end of the switching member 24 to reduce the friction between the third pin 24a and the lever 82.

The first pin 80 is configured to slidably move relative to the first coupling end 76 along the first curved end 76a of the first coupling end 76 when the connecting rod 70 moves in the longitudinal direction D3. Since there is the first clearance CL1 between the first pin 80 and the first curved end 76a, even though the first pin 80 slightly moves in a direction perpendicular to the longitudinal direction D3, the first pin 80 can move the connecting rod 70 straightly in the longitudinal direction D3.

While the actuation structure 18 has a mechanical construction such as the lever 82 in the illustrated embodiment, the actuation structure 18 has other constructions such as an electric-powered construction and a hydraulic construction if needed and/or desired. Further, switching member 24 can be an electrical switch to actuate the positioning structure, if needed and/or desired.

Figure 12:
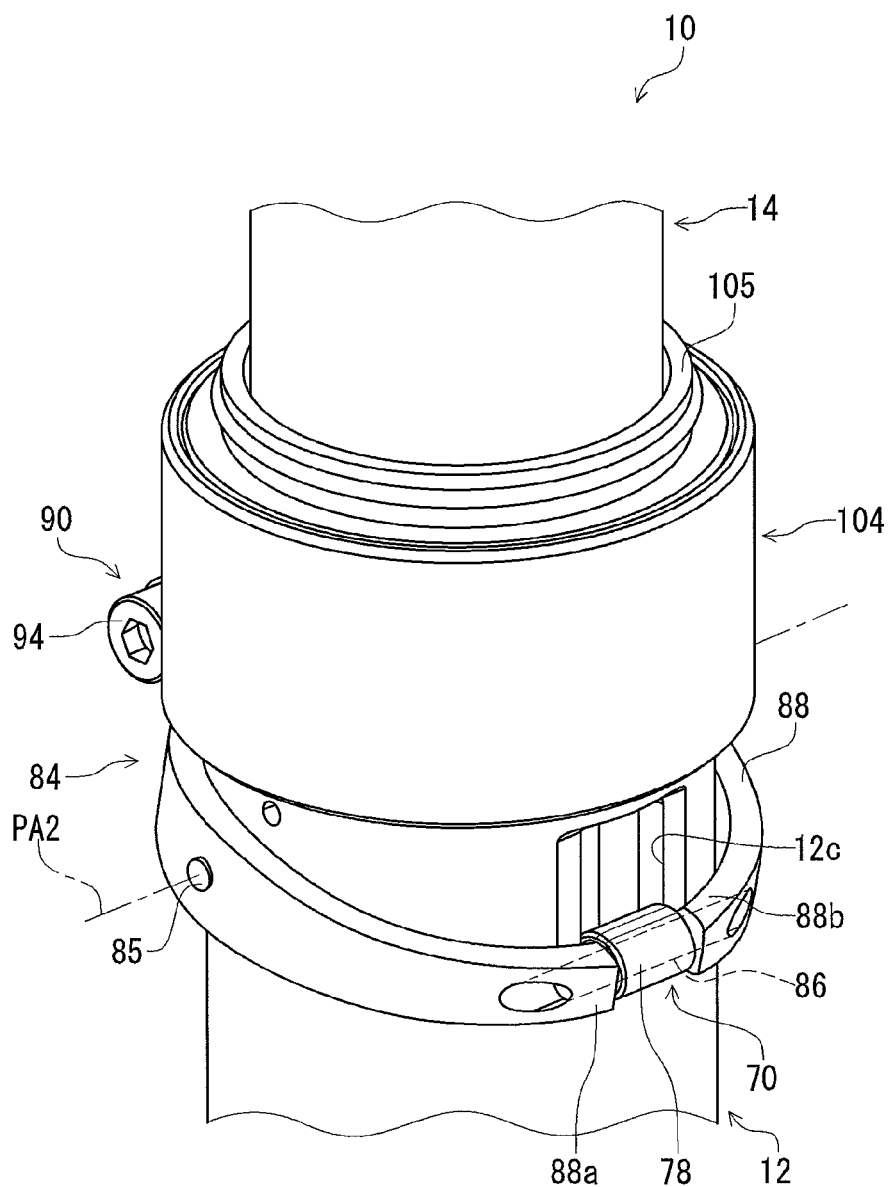
FIG. 12 is a partial perspective view of the bicycle seatpost assembly illustrated in FIG. 1 with an outer cover omitted.

As seen in FIGS. 9 and 12, the first cylinder 12 includes an opening 12c. The second coupling end 78 extends through the opening 12c. The second coupling end 78 is movable in the opening 12c in the longitudinal direction D3. As seen in FIG. 9, the guide groove 12b extends from the opening 12c to the distal end 19 in the longitudinal direction D3. The opening 12c is closer to the opposite end 72 than the distal end 19.

Figure 13:
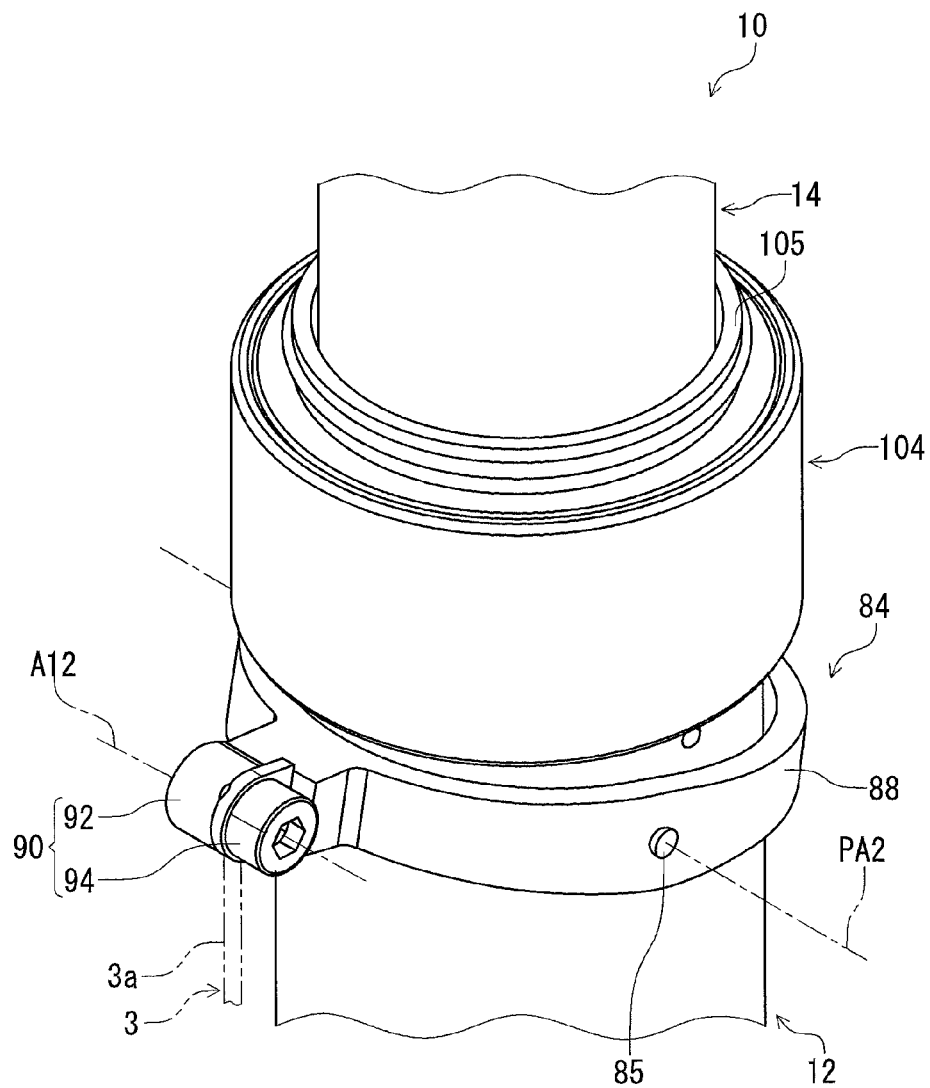
FIG. 13 is a partial perspective view of the bicycle seatpost assembly illustrated in FIG. 1 with the outer cover omitted.

As seen in FIGS. 12 and 13, the bicycle seatpost assembly 10 further comprises a pivot member 84 pivotable relative to the first cylinder 12 about a pivot axis PA2. In the illustrated embodiment, the pivot member 84 is pivotably coupled to the first cylinder 12 via pivot pins 85.

As seen in FIG. 9, the connecting rod 70 is configured to be coupled to the control cable 3 via the pivot member 84. The pivot member 84 includes a second pin 86 configured to be coupled to the second coupling end 78 of the connecting rod 70. The second coupling end 78 extends from the second rod end 74b of the rod body 74 toward the second pin 86 and is contactable with the second pin 86. The second coupling end 78 includes a second curved end 78a spaced apart from the second rod end 74b. The second pin 86 is provided between the second curved end 78a and the second rod end 74b. A second clearance CL2 is provided between the second pin 86 and the second curved end 78a. The second pin 86 is configured to slidably move relative to the second coupling end 78 along the second curved end 78a of the second coupling end 78 when the connecting rod 70 moves in the longitudinal direction D3. Since there is the second clearance CL2 between the second pin 86 and the second curved end 78a, even though the second pin 86 slightly moves in a direction perpendicular to the longitudinal direction D3, the second pin 86 can move the connecting rod 70 straightly in the longitudinal direction D3.

The second pin 86 is at least partly provided radially outward of the first cylinder 12 in the rest state where the connecting rod 70 is not operated via the control cable 3. In the illustrated embodiment, the second pin 86 is partly provided radially outward of the first cylinder 12 in the rest state where the connecting rod 70 is not operated via the control cable 3. However, the second pin 86 can be entirely provided radially outward of the first cylinder 12 in the rest state of the connecting rod 70. In the illustrated embodiment, the second pin 86 is provided radially outward of the rod body 74. Thus, the second coupling end extends radially outward from the rod body to contact with the second pin 86.

As seen in FIG. 9, the pivot member 84 is closer to the opposite end 72 than the distal end 19. Accordingly, it is possible to replace the control cable 3 with another control cable without detaching the bicycle seatpost assembly 10 from the seat tube 1a or without disassembling the bicycle seatpost assembly 10.

As seen in FIGS. 12 and 13, the pivot member 84 includes a pivot body 88. The pivot body 88 has a substantially annular shape. The pivot body 88 is provided around the first cylinder 12. The pivot body 88 is pivotably coupled to the first cylinder 12 about the pivot axis PA2 via the pivot pins 85.

As seen in FIG. 12, the second pin 86 is secured to the pivot body 88. The pivot body 88 includes a first end portion 88a and a second end portion 88b. The first end portion 88a is spaced apart from the second end portion 88b. The second pin 86 is coupled to the first end portion 88a and the second end portion 88b to couple the first end portion 88a and the second end portion 88b. The second coupling end 78 of the connecting rod 70 is provided between the first end portion 88a and the second end portion 88b. The second pin 86 is non-rotatably fixed to the first end portion 88a and the second end portion 88b. However, the second pin 86 can be rotatably connected to the pivot body 88 to reduce the friction between the second pin 86 and the second coupling end 78.

As seen in FIG. 13, the pivot member 84 includes a cable attachment portion 90 to which the inner wire 3a of the control cable 3 is attached. The cable attachment portion 90 includes an attachment base part 92 and an attachment bolt 94. The attachment base part 92 extends from the pivot body 88. The attachment bolt 94 is threadedly engaged with the attachment base part 92. An end of the inner wire 3a is attached to the attachment base part 92 with the attachment bolt 94.

Figure 14:
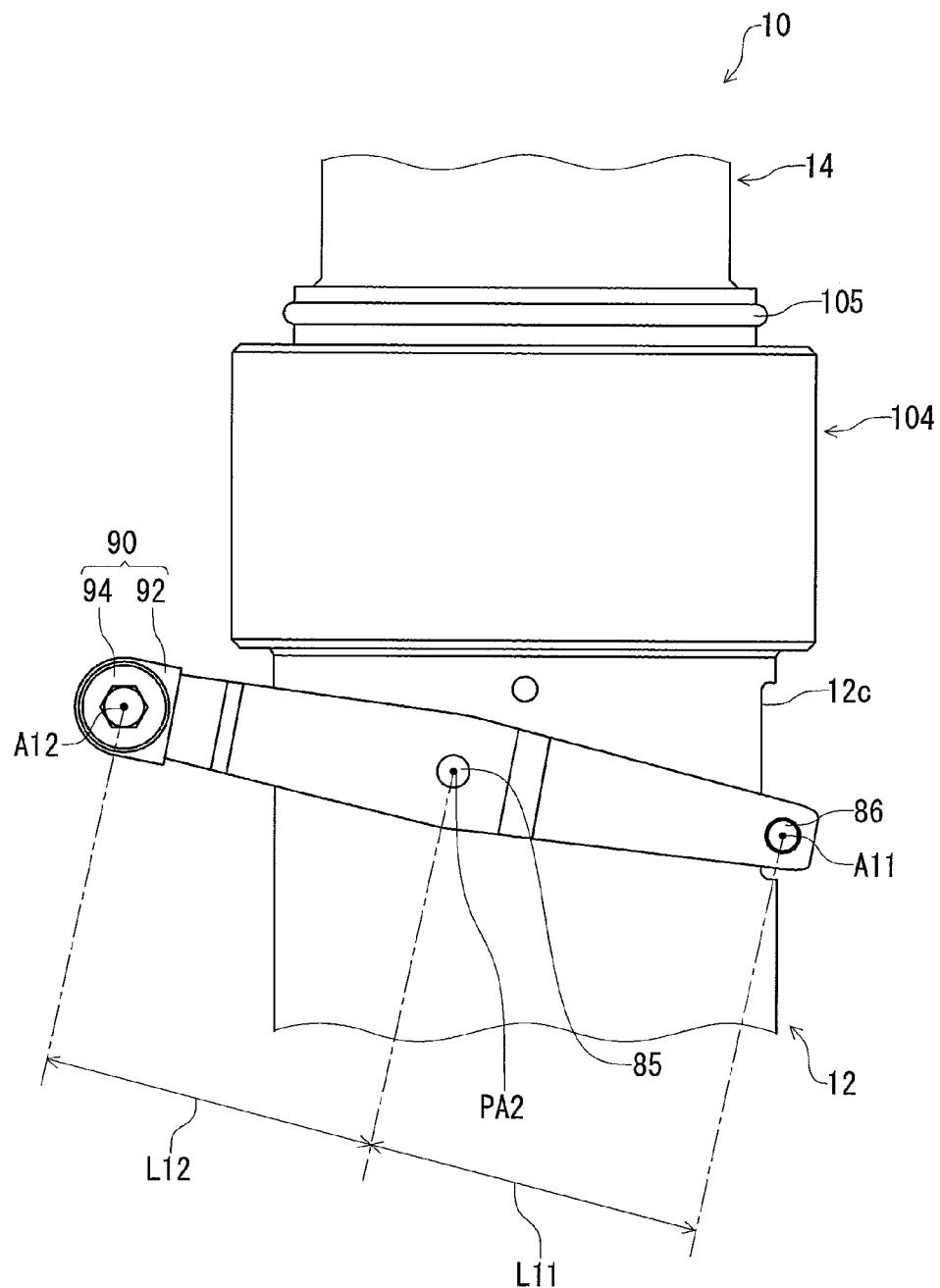
FIG. 14 is a partial side elevational view of the bicycle seatpost assembly illustrated in FIG. 1 with the outer cover omitted.

As seen in FIG. 14, the cable attachment portion 90 is provided on an opposite side of the second pin 86 relative to the pivot axis PA2. The pivot axis PA2 is offset from a center of the first cylinder 12 when viewed from the pivot axis PA2. A first distance L11 defined between the pivot axis PA2 and the second pin 86 is longer than a second distance L12 defined between the pivot axis PA2 and the cable attachment portion 90. Specifically, the first distance L11 is defined between the pivot axis PA2 and a center axis A11 of the second pin 86. The second distance L12 is defined between the pivot axis PA2 and a center axis A12 of the attachment bolt 94. However, the first distance L11 can be equal to or shorter than the second distance L12 if needed and/or desired. Further, the center axis A11 is closer to the outer peripheral surface of the first cylinder 12 than the center axis A12.

Figure 15:
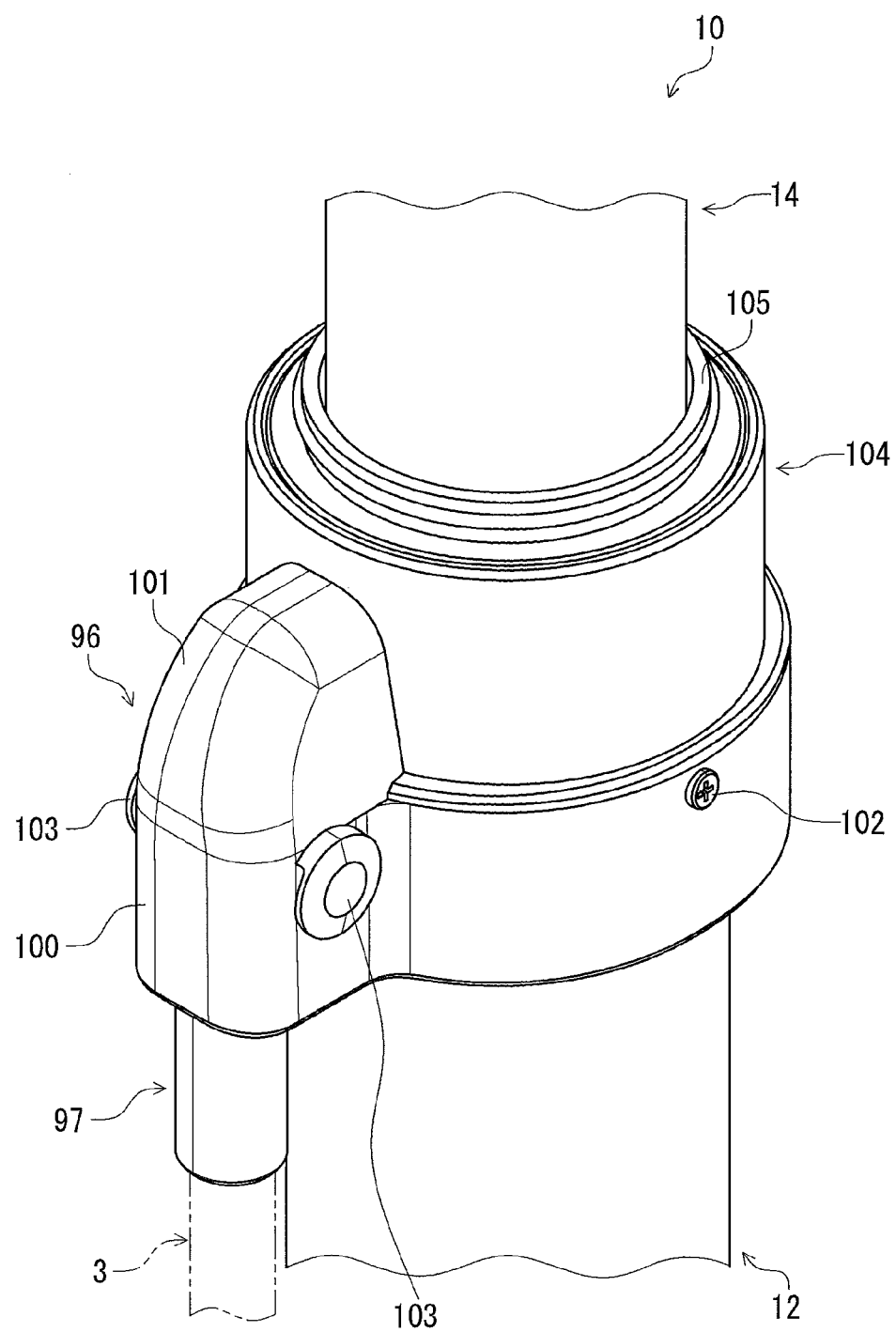
FIG. 15 is a partial perspective view of the bicycle seatpost assembly illustrated in FIG. 1 with the outer cover.

As seen in FIGS. 9 and 15, the bicycle seatpost assembly 10 further comprises an outer cover 96 including an accommodation space S1 (FIG. 9) in which the pivot member 84 is pivotally provided. The outer cover 96 includes a cable guiding portion 97 configured to guide the control cable 3 in the longitudinal direction D3 of the first cylinder 12. The cable guiding portion 97 includes a guiding hole 98 through which the control cable 3 is to extend. The guiding hole 98 extends from the accommodation space S1 in the longitudinal direction D3 toward the distal end 19 of the first cylinder 12. The cable guiding portion 97 includes an outer-casing attachment part 99 to which an outer casing 3b of the control cable 3 is to be attached. In the illustrated embodiment, the guiding hole 98 includes a first guiding hole 98a and a second guiding hole 98b. The inner wire 3a of the control cable 3 extends through the first guiding hole 98a. An end of the outer casing 3b of the control cable 3 is provided in the second guiding hole 98b. The outer-casing attachment part 99 includes the second guiding hole 98b.

The outer cover 96 includes a first cover 100 and a second cover 101. The first cover 100 and the second cover 101 define the accommodation space S1. The cable guiding portion 97 extends from the first cover 100 toward the distal end 19 of the first cylinder 12. The second cover 101 is provided on an opposite side of the cable guiding portion 97 relative to the first cover 100.

Figure 16:
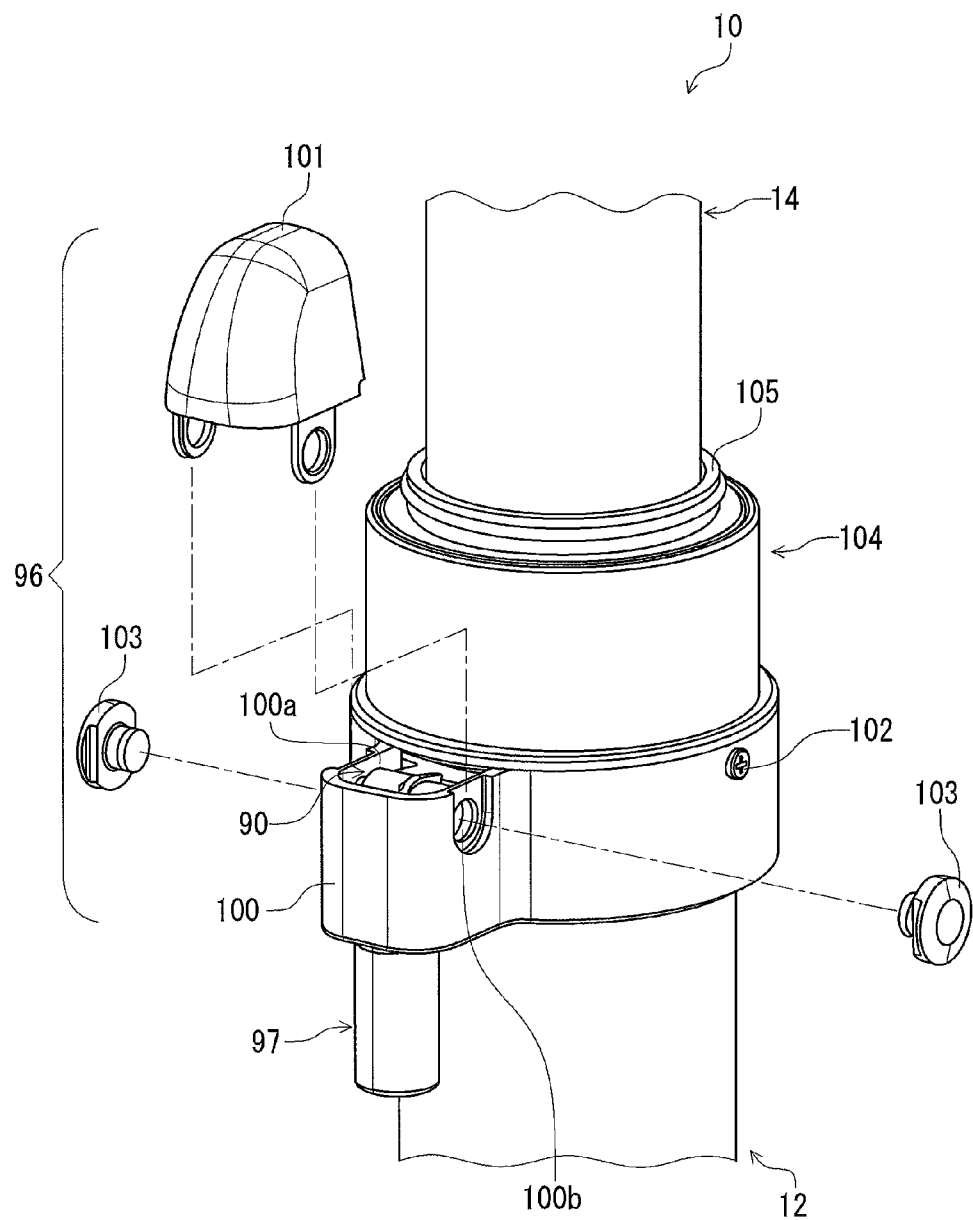
FIG. 16 is a partial exploded perspective view of the bicycle seatpost assembly illustrated in FIG. 1 with the outer cover.

As seen in FIG. 16, the first cover 100 is secured to the first cylinder 12 via first fasteners 102. The second cover 101 is attached to the first cover 100 via second fasteners 103. The first cover 100 includes an opening 100a and threaded holes 100b. The second cover 101 covers the upper opening 100a in a state where the second cover 101 is attached to the first cover 100. The second fasteners 103 are threadedly engaged with the threaded holes 100b. It is possible to access the cable attachment portion 90 in a state where the second cover 101 and the second fasteners 103 are removed from the first cover 100.

As seen in FIG. 9, the bicycle seatpost assembly 10 further comprises an end cap 104, a seal element 105, a receiving element 106, and stoppers 108 (FIG. 10). The end cap 104 is attached to the opposite end 72 of the first cylinder 12. The seal element 105 is attached to the end cap 104. The receiving element 106 has an annular shape and is provided in the first cylinder 12. The receiving element 106 is provided between the end cap 104 and the first cylinder 12 in the longitudinal direction D3 to be positioned relative to the first cylinder 12. The stoppers 108 extends in the longitudinal direction D3.

As seen in FIG. 10, the stoppers 108 are attached to the second cylinder 14. In the illustrated embodiment, the second cylinder 14 includes attachment recesses 14b. The stoppers 108 are respectively fitted in the attachment recesses 14b. The stoppers 108 are contactable with the receiving element 106 in the longitudinal direction D3. The stoppers 108 and the receiving element 106 define the maximum overall length L0 (FIG. 2). The first cylinder 12 includes grooves 12d. The stoppers 108 are provided in the grooves 12d. As seen in FIG. 9, the grooves 12d extends in the telescopic direction D1. The stoppers 108 is movable in the grooves 12d in the telescopic direction D1. The stoppers 108 and the grooves 12d restrict a relative rotation between the first cylinder 12 and the second cylinder 14.

As seen in FIGS. 9 and 15, the outer cover 96 is adjacent to the end cap 104 in the longitudinal direction D3 of the first cylinder 12. As seen in FIG. 9, the outer cover 96 is closer to the distal end 19 of the first cylinder 12 than the end cap 104. The pivot member 84 is closer to the distal end 19 of the first cylinder 12 than the end cap 104.

The operation of the bicycle seatpost assembly 10 will be described in detail below.

As seen in FIG. 4, the third seal member 55 is disposed radially inward of the recesses 28b of the inner tube 28 in a state where the overall length of the bicycle seatpost assembly 10 is the maximum overall length L0 (FIG. 2). In this state, the third gate G3 is open so that the first chamber C1 is in communicate with the second intermediate chamber C12 via the third gate G3. The first chamber C1 is in communication with the second valve chamber VC2 via the third gate G3, the second intermediate chamber C12, and the third through-holes 46 in the closed state where the switching member 24 is positioned at the closed position P10.

As seen in FIGS. 6 and 9, the inner wire 3a of the control cable 3 is pulled in a first direction D41 by the second amount of operation when the operated member 4 is pivoted relative to the base member 5 from the rest position P0 to the second operated position P2 about the pivot axis A1 (FIG. 2). This pivots the pivot member 84 relative to the first cylinder 12 about the pivot axis PA2, moving the connecting rod 70 in a second direction D42 opposite to the first direction D41. The first direction D41 and the second direction D42 are parallel to the longitudinal direction D3 of the first cylinder 12.

Movement of the connecting rod 70 in the second direction D42 pivots the pivot element 82 relative to the first cylinder 12 about the lever pivot axis PA1. Thus, the switching member 24 is moved from the closed position P10 to the second open position P12. At this time, as seen in FIG. 6, the second gate G2 is open so that the first chamber C1 is in communication with the third chamber C3 via the second passageway PW2. This allows the substantially incompressible fluid to flow between the first chamber C1 and the third chamber C3 via the second passageway PW2.

When the rider's weight is applied to the second cylinder 14 via the mounting structure 15 (FIG. 2), fluid pressure increases in the first chamber C1. This causes the substantially incompressible fluid to flow from the first chamber C1 to the third chamber C3 via the second passageway PW2. At this time, the piston 40 is pressed toward the biasing chamber C4 relative to the first cylinder 12, causing the compressible fluid to be compressed in the biasing chamber C4. This allows the second cylinder 14 to be downwardly moved relative to the first cylinder 12 using the rider's weight (FIGS. 7 and 8).

On the other hand, when the rider's weight is released from the second cylinder 14, the compressible fluid compressed in the biasing chamber C4 biases the second cylinder 14 to upwardly move relative to the first cylinder 12 in the telescopic direction D1. This causes the substantially incompressible fluid to flow from the third chamber C3 to the first chamber C1 via the second passageway PW2. The second cylinder 14 is upwardly moved relative to the first cylinder 12 while the rider's weight is released from the second cylinder 14.

As seen in FIG. 4, the switching member 24 returns to the closed position P10 by the biasing force from the biasing element 34 when an operating force is released from the operated member 4 (FIG. 2). This returns the lever 82, the connecting rod 70, and the pivot member 84 to initial positions illustrated in FIG. 9. The second gate G2 is closed when the switching member 24 returns to the closed position P10, causing the substantially incompressible fluid to stop flowing between the first chamber C1 and the third chamber C3 via the second passageway PW2 (FIG. 6). This allows the second cylinder 14 to be positioned at any position within the second adjustable range AR2 (FIG. 2) corresponding to the range RG1 of the recesses 28b.

As seen in FIG. 8, when the third seal member 55 reaches the upper side of the recesses 28b, the third seal member 55 comes in contact with the inner peripheral surface 28a of the inner tube 28 along the inner whole periphery of the inner tube 28. This closes the third gate G3 so that the substantially incompressible fluid stops flowing from the first chamber C1 to the third chamber C3. This allows the second cylinder 14 to be positioned at a position corresponding to the intermediate overall length L2 (FIG. 2) relative to the first cylinder 12 by just operating the operated member 4 of the operating device 2 to the second operated position P2. The second cylinder 14 does not move relative to the first cylinder 12 in the telescopic direction D1 until the first gate G1 is open.

Figure 17:
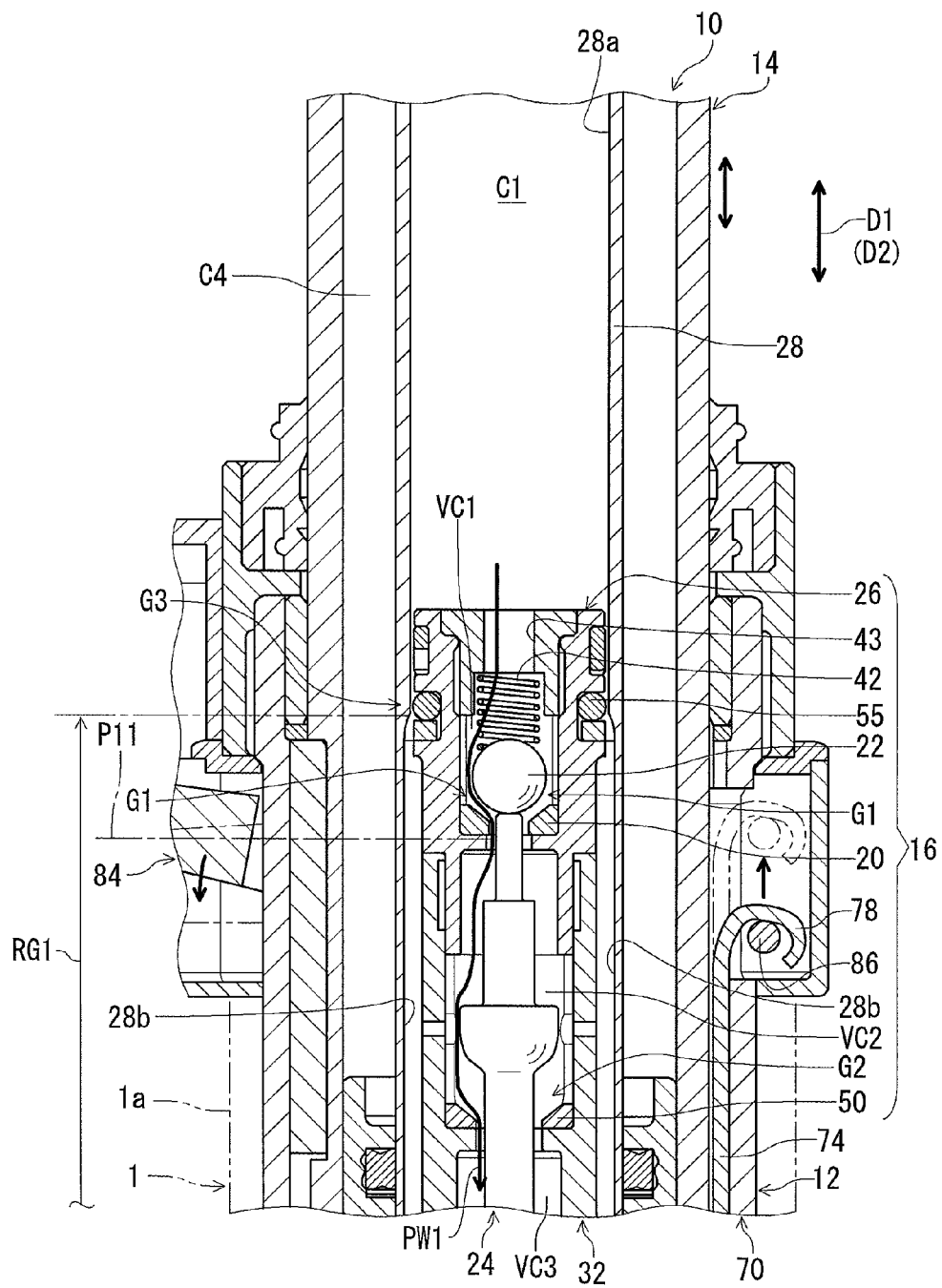
FIG. 17 is an enlarged partial cross-sectional view of the bicycle seatpost assembly illustrated in FIG. 1 (the closed position).

As seen FIGS. 5 and 17, the inner wire 3a of the control cable 3 is pulled in the first direction D41 by the first amount of operation when the operated member 4 is pivoted relative to the base member 5 from the rest position P0 to the first operated position P1 about the pivot axis A1 (FIG. 2). This pivots the pivot member 84 relative to the first cylinder 12 about the pivot axis PA2, moving the connecting rod 70 in a second direction D42 opposite to the first direction D41. Thus, the switching member 24 is moved from the closed position P10 to the first open position P11. At this time, as seen in FIG. 5, the first gate G1 and the second gate G2 are open so that the first chamber C1 is in communication with the third chamber C3 via the first passageway PW1. This allows the substantially incompressible fluid to flow between the first chamber C1 and the second chamber C2 via the first passageway PW1 and the second passageway PW2. However, the positioning structure 16 can have such a construction that the second passageway PW2 is closed in a state where the first passageway PW1 is open.

When the rider's weight is applied to the second cylinder 14 via the mounting structure 15 (FIG. 2), the fluid pressure increases in the first chamber C1. This causes the substantially incompressible fluid to flow from the first chamber C1 to the third chamber C3 via the first passageway PW1. At this time, the piston 40 is pressed toward the biasing chamber C4 relative to the first cylinder 12, causing the compressible fluid to be compressed in the biasing chamber C4. This allows the second cylinder 14 to be downwardly moved relative to the first cylinder 12 using the rider's weight (FIG. 17).

On the other hand, when the rider's weight is released from the second cylinder 14, the compressible fluid compressed in the biasing chamber C4 biases the second cylinder 14 to upwardly move relative to the first cylinder 12 in the telescopic direction D1. This causes the substantially incompressible fluid to flow from the third chamber C3 to the first chamber C1 via the first passageway PW1. The second cylinder 14 is upwardly moved relative to the first cylinder 12 while the rider's weight is released from the second cylinder 14.

The first gate G1 and the second gate G2 are closed when the switching member 24 returns to the closed position P10 (FIG. 4), causing the substantially incompressible fluid to stop flowing between the first chamber C1 and the third chamber C3 via the first passageway PW1 (FIG. 5). Accordingly, a relative position between the first cylinder 12 and the second cylinder 14 can be continuously adjusted regardless of the recesses 28b in the first open state where the switching member 24 is disposed at the first open position P11.

With the bicycle seatpost assembly 10, it is possible to obtain the following advantageous effects.

(1) The connecting rod 70 is configured to operatively couple a control cable 3 to the actuation structure 18, and the connecting rod 70 extends from the distal end 19 of the first cylinder 12 in the longitudinal direction of the first cylinder 12. Accordingly, it is possible to adjust a route of the control cable 3 to a preferable route suitable for a bicycle by changing a construction of the connecting rod 70.

(2) The connecting rod 70 is provided in the first cylinder 12. Accordingly, it is possible to utilize an inner space of the first cylinder 12, suppressing enlargement of the bicycle seatpost assembly 10 caused by the connecting rod 70.

(3) The connecting rod 70 is at least partly provided between the inner peripheral surface 12a and the outer peripheral surface 14a. Accordingly, it is possible to utilize a space between the first cylinder 12 and the second cylinder 14, suppressing enlargement of the bicycle seatpost assembly 10 caused by the connecting rod 70.

(4) The connecting rod 70 is provided in the guide groove 12b. Accordingly, it is possible to utilize the space between the first cylinder 12 and the second cylinder 14, suppressing enlargement of the bicycle seatpost assembly 10 caused by the connecting rod 70. Furthermore, the guide groove 12b can make the movement of the connecting rod 70 smoother.

(5) Since the connecting rod 70 includes the first coupling end 76 and the second coupling end 78, it is possible to easily couple the actuation structure 18 and the control cable 3 to the connecting rod 70.

(6) Since the first maximum length ML1 is longer than the second maximum length ML2, it is possible to improve the design possibility of the actuation structure 18. Furthermore, it is possible to make the second coupling end compact, suppressing enlargement of the bicycle seatpost assembly 10 caused by the connecting rod 70.

(7) The pivot member 84 includes the first pin 80 configured to be coupled to the first coupling end 76 of the connecting rod 70. Accordingly, it is possible to simplify a structure of the first coupling end 70.

(8) The first rod end 74a of the rod body 74 is spaced apart from the first pin 80 in a rest state where the connecting rod 70 is not operated via the control cable 3. Accordingly, it is possible to prevent interference between the first pin 80 and the first rod end 74a, allowing the connecting rod 70 to smoothly move.

(9) Since the connecting rod 70 is configured to be coupled to the control cable 3 via the pivot member 84, the pivot member can make a movement direction of the connecting rod 70 different from a pulling direction of the control cable 3. Accordingly, it is possible to adjust the pulling direction of the control cable 3 to a preferable direction suitable for the arrangement of the bicycle seatpost assembly 10.

(10) The pivot member 84 includes the second pin 86 configured to be coupled to the second coupling end 78 of the connecting rod 70. Accordingly, it is possible to simplify a structure of the second coupling end 78.

(11) The first distance L11 defined between the pivot axis PA2 and the second pin 86 is longer than the second distance L12 defined between the pivot axis PA2 and the cable attachment portion 90. Accordingly, it is possible to reduce a pulling force applied to the control cable 3.

(12) Since the bicycle seatpost assembly 10 further comprises the outer cover 96, it is possible to protect the pivot member 84.

(13) The outer cover 96 includes the cable guiding portion 97 configured to guide the control cable 3 in the longitudinal direction D3 of the first cylinder 12. Accordingly, it is possible to stabilize an operation of the control cable 3.

(14) The cable guiding portion 97 includes the guiding hole 98 through which the control cable 3 is to extend. The guiding hole 98 extends from the accommodation space S1 in the longitudinal direction D3 toward the distal end 19 of the first cylinder 12. Accordingly, it is possible to guide the control cable 3 with protecting the pivot member 84.

(15) The cable guiding portion 97 includes the outer-casing attachment part 99 to which the outer casing 3b of the control cable 3 is to be attached. Accordingly, it is possible to easily attach the outer casing 3b of the control cable 3 to the outer cover 96.

(16) Since the rod body 74 has the cross-sectional shape different from a circular shape, it is possible to improve the design possibility of the connecting rod 70.

(17) The cross-sectional shape of the rod body 74 is an elongated shape along the inner peripheral surface 12a. Accordingly, it is possible to efficiently arrange the rod body 74 in the first cylinder 12, suppress enlargement of the bicycle seatpost assembly 10.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
    a first cylinder;
    a second cylinder configured to be telescopically received in the first cylinder;
    a positioning structure configured to relatively position the first cylinder and the second cylinder, the positioning structure including a switching member movable relative to the first cylinder in a first movement direction and in a second movement direction opposite to the first movement direction, the positioning structure being configured to switch a state of the positioning structure between
        a positioning state where the first cylinder and the second cylinder are relatively positioned, and
        an adjustable state where a relative position between the first cylinder and the second cylinder is adjustable;
    an actuation structure configured to actuate the positioning structure and disposed at a distal end of the first cylinder; and
    a connecting rod configured to operatively couple a control cable to the actuation structure, the connecting rod extending from the distal end of the first cylinder in a longitudinal direction of the first cylinder, the connecting rod being movable relative to the first cylinder in the first movement direction and in the second movement direction in a radially outer area defined radially outward of the switching member, the switching member being operatively coupled to the connecting rod via the actuation structure to move relative to the first cylinder in the first movement direction in response to a first movement of the connecting rod relative to the first cylinder in the first movement direction in the radially outer area of the switching member.

2. The bicycle seatpost assembly according to claim 1, wherein
    the connecting rod is provided in the first cylinder.

3. The bicycle seatpost assembly according to claim 2, wherein
    the first cylinder includes an inner peripheral surface,
    the second cylinder includes an outer peripheral surface provided to face the inner peripheral surface of the first cylinder, and
    the connecting rod is at least partly provided between the inner peripheral surface and the outer peripheral surface.

4. The bicycle seatpost assembly according to claim 3, wherein
the first cylinder includes a guide groove extending in the longitudinal direction and provided on the inner peripheral surface, and
the connecting rod is provided in the guide groove.

5. The bicycle seatpost assembly according to claim 1, wherein
the actuation structure is configured to move the switching member in the longitudinal direction parallel to each of the first movement direction and the second movement direction.

6. The bicycle seatpost assembly according to claim 5, wherein
the first cylinder includes an opposite end opposite to the distal end in the longitudinal direction, and
the actuation structure is configured to move the switching member in the longitudinal direction toward the opposite end of the first cylinder.

7. The bicycle seatpost assembly according to claim 1, wherein
the connecting rod includes
a rod body extending along the longitudinal direction and including a first rod end and a second rod end opposite to the first rod end,
a first coupling end provided at the first rod end and configured to be coupled to the actuation structure, and
a second coupling end provided at the second rod end and configured to be coupled to the control cable.

8. The bicycle seatpost assembly according to claim 7, wherein
the first coupling end has a first maximum length defined from the first rod end,
the second coupling end has a second maximum length defined from the second rod end, and
the first maximum length is longer than the second maximum length.

9. The bicycle seatpost assembly according to claim 7, wherein
the actuation structure includes a first pin configured to be coupled to the first coupling end of the connecting rod, and
the first coupling end extends from the first rod end of the rod body toward the first pin and is contactable with the first pin.

10. The bicycle seatpost assembly according to claim 7, further comprising:
a pivot member pivotable relative to the first cylinder about a pivot axis, wherein
the connecting rod is configured to be coupled to the control cable via the pivot member.

11. The bicycle seatpost assembly according to claim 10, wherein
the pivot member includes a second pin configured to be coupled to the second coupling end of the connecting rod.

12. The bicycle seatpost assembly according to claim 11, wherein
the second coupling end extends from the second rod end of the rod body toward the second pin and is contactable with the second pin.

13. The bicycle seatpost assembly according to claim 11, wherein
the pivot member includes a cable attachment portion to which an inner wire of the control cable is attached, and
a first distance defined between the pivot axis and the second pin is longer than a second distance defined between the pivot axis and the cable attachment portion.

14. The bicycle seatpost assembly according to claim 13, further comprising:
an outer cover including an accommodation space in which the pivot member is pivotally provided.

15. The bicycle seatpost assembly according to claim 14, wherein
the outer cover includes a cable guiding portion configured to guide the control cable in the longitudinal direction of the first cylinder.

16. The bicycle seatpost assembly according to claim 15, wherein
the cable guiding portion includes a guiding hole through which the control cable is to extend, and
the guiding hole extends from the accommodation space in the longitudinal direction toward the distal end of the first cylinder.

17. The bicycle seatpost assembly according to claim 15, wherein
the cable guiding portion includes an outer-casing attachment part to which an outer casing of the control cable is to be attached.

18. The bicycle seatpost assembly according to claim 7, wherein
the rod body has a cross-sectional shape different from a circular shape, the cross-sectional shape being taken along a virtual plane perpendicular to the longitudinal direction of the first cylinder.

19. The bicycle seatpost assembly according to claim 18, wherein
the first cylinder includes an inner peripheral surface, and
the cross-sectional shape of the rod body is an elongated shape circumferentially extending along the inner peripheral surface of the first cylinder.

20. The bicycle seatpost assembly according to claim 1, wherein
the switching member is operatively coupled to the connecting rod via the actuation structure to move relative to the first cylinder in the second movement direction in response to a second movement of the connecting rod relative to the first cylinder in the second movement direction in the radially outer area of the switching member.

21. The bicycle seatpost assembly according to claim 20, wherein
the positioning structure is movable relative to the first cylinder in the first movement direction in response to the first movement of the connecting rod to switch the state of the positioning structure from the positioning state to the adjustable state.

22. The bicycle seatpost assembly according to claim 21, wherein
the positioning structure is movable relative to the first cylinder in the second movement direction in response to the second movement of the connecting rod to switch the state of the positioning structure from the adjustable state to the positioning state.

23. A bicycle seatpost assembly comprising:
a first cylinder;
a second cylinder configured to be telescopically received in the first cylinder;
a positioning structure configured to relatively position the first cylinder and the second cylinder;

an actuation structure configured to actuate the positioning structure and disposed at a distal end of the first cylinder; and
a connecting rod configured to operatively couple a control cable to the actuation structure, the connecting rod extending from the distal end of the first cylinder in a longitudinal direction of the first cylinder,
the connecting rod including
  a rod body extending along the longitudinal direction and including a first rod end and a second rod end opposite to the first rod end,
  a first coupling end provided at the first rod end and configured to be coupled to the actuation structure, and
  a second coupling end provided at the second rod end and configured to be coupled to the control cable,
the actuation structure including a first pin configured to be coupled to the first coupling end of the connecting rod,
the first coupling end extending from the first rod end of the rod body toward the first pin and is contactable with the first pin, and
the first rod end of the rod body being spaced apart from the first pin in a rest state where the connecting rod is not operated via the control cable.

24. A bicycle seatpost assembly comprising:
a first cylinder;
a second cylinder configured to be telescopically received in the first cylinder;
a positioning structure configured to relatively position the first cylinder and the second cylinder;
an actuation structure configured to actuate the positioning structure and disposed at a distal end of the first cylinder;
a connecting rod configured to operatively couple a control cable to the actuation structure, the connecting rod extending from the distal end of the first cylinder in a longitudinal direction of the first cylinder; and
a pivot member pivotable relative to the first cylinder about a pivot axis,
the connecting rod including
  a rod body extending along the longitudinal direction and including a first rod end and a second rod end opposite to the first rod end,
  a first coupling end provided at the first rod end and configured to be coupled to the actuation structure, and
  a second coupling end provided at the second rod end and configured to be coupled to the control cable,
the connecting rod being configured to be coupled to the control cable via the pivot member,
the pivot member including a second pin configured to be coupled to the second coupling end of the connecting rod, and
the second pin being at least partly provided radially outward of the first cylinder in a rest state where the connecting rod is not operated via the control cable.

* * * * *